(12) United States Patent
Lochtefeld et al.

(10) Patent No.: US 8,561,221 B2
(45) Date of Patent: Oct. 22, 2013

(54) METHOD AND APPARATUS FOR DAMPENING WAVES IN A WAVE POOL

(76) Inventors: Thomas J. Lochtefeld, La Jolla, CA (US); Hendrik Dirk van Ettinger, The Hague (NL); Dirk Bastenhof, DC Ede (NL)

(*) Notice: Subject to any disclaimer, the term of this patent is extended or adjusted under 35 U.S.C. 154(b) by 544 days.

(21) Appl. No.: 12/592,464

(22) Filed: Nov. 25, 2009

(65) Prior Publication Data

US 2010/0125943 A1    May 27, 2010

Related U.S. Application Data

(60) Provisional application No. 61/200,183, filed on Nov. 25, 2008.

(51) Int. Cl.
*A47K 3/10*    (2006.01)
(52) U.S. Cl.
USPC .................................................................. 4/491
(58) Field of Classification Search
USPC ............. 4/488, 491; 482/55; 405/52, 79, 117, 405/88, 167, 128, 217
See application file for complete search history.

(56) References Cited

U.S. PATENT DOCUMENTS

| | | |
|---|---|---|
| 2,056,855 A | 10/1936 | Herz |
| 3,598,402 A | 8/1971 | Frenzl |
| 3,802,697 A | 4/1974 | Le Mehaute |
| 3,913,332 A | 10/1975 | Forsman |
| 4,062,192 A | 12/1977 | Biewer |
| 4,792,260 A | 12/1988 | Sauerbier |
| 4,805,896 A | 2/1989 | Moody |
| 4,836,709 A | 6/1989 | Ploeg et al. |
| 4,905,987 A | 3/1990 | Frenzi |
| 4,954,014 A | 9/1990 | Sauerbier et al. |
| 4,976,570 A | 12/1990 | Davis et al. |
| 5,342,145 A | 8/1994 | Cohen |
| 5,766,082 A | 6/1998 | Lochtefeld et al. |
| 6,241,422 B1 * | 6/2001 | Makowski ...................... 405/79 |
| 6,336,771 B1 * | 1/2002 | Hill ................................. 405/79 |
| 6,460,201 B1 | 10/2002 | Lochtefeld |
| 6,738,992 B2 | 5/2004 | Lochtefeld |

* cited by examiner

*Primary Examiner* — Lori Baker
(74) *Attorney, Agent, or Firm* — J. John Shimazaki

(57) ABSTRACT

A wave pool for producing periodic waves preferably having a first wave forming portion with an inclined section oriented obliquely relative to the travel direction of the waves, and a second wave dampening portion having a relatively deep solid chamber floor and a raised perforated floor above it for dampening the waves. The wave dampening portion preferably dissipates the waves, which in turn, reduces wave reflections and rip currents that can otherwise interfere with the oncoming waves.

24 Claims, 15 Drawing Sheets

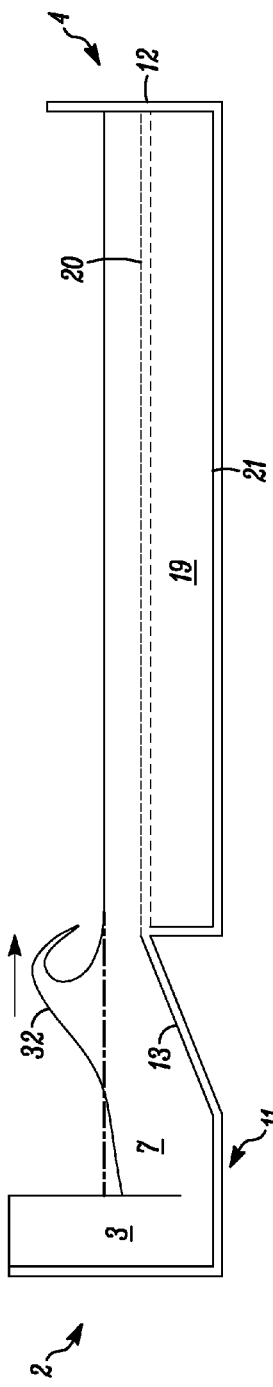
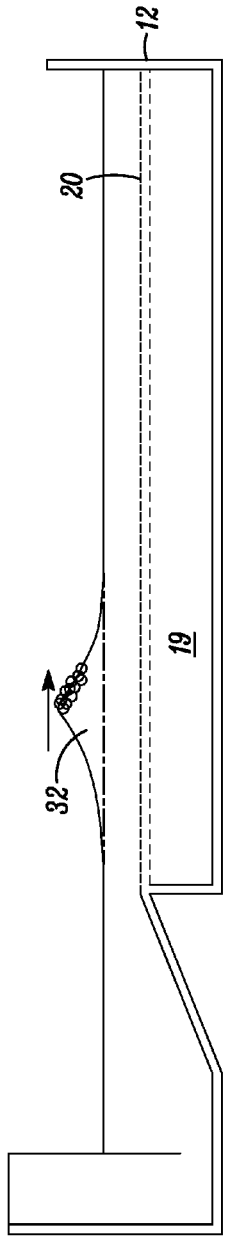
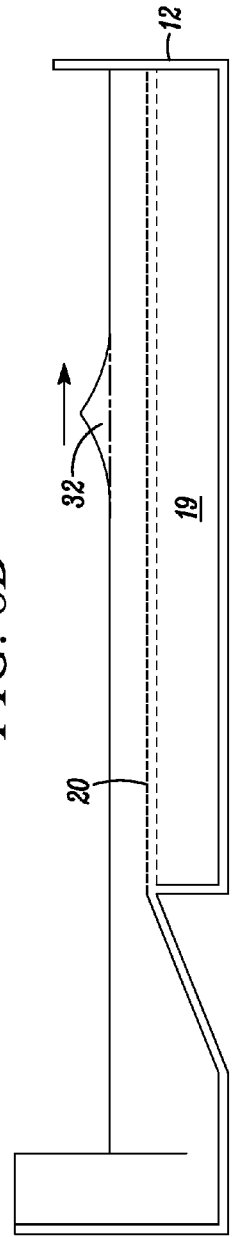
FIG. 8A
FIG. 8B
FIG. 8C

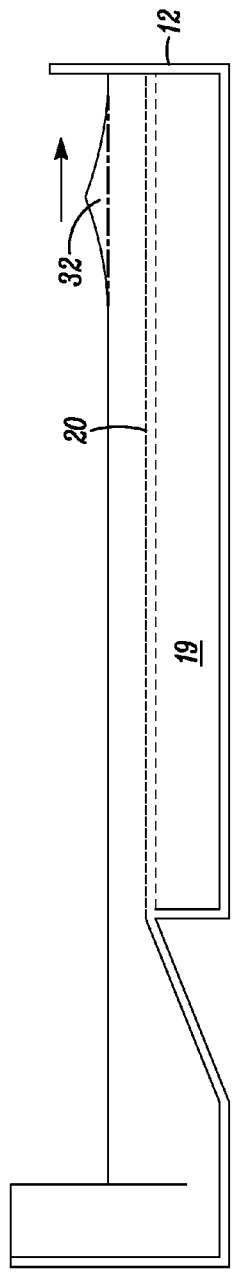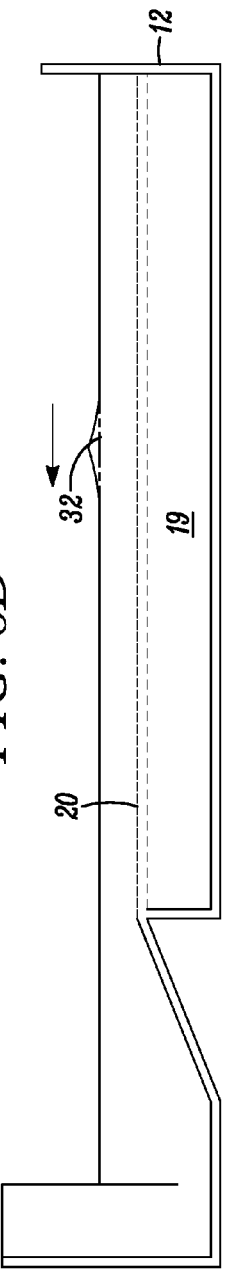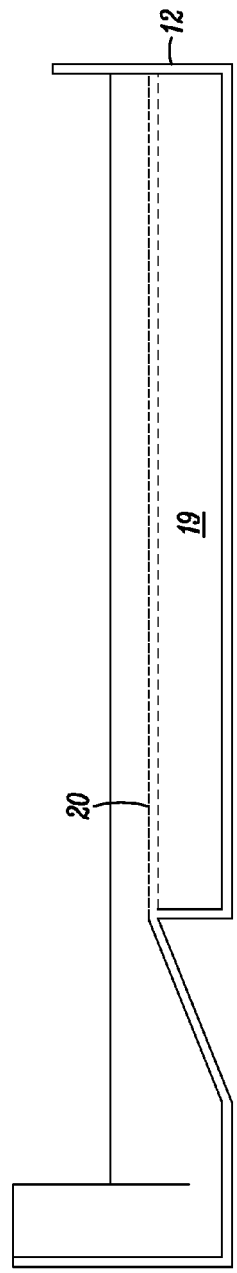

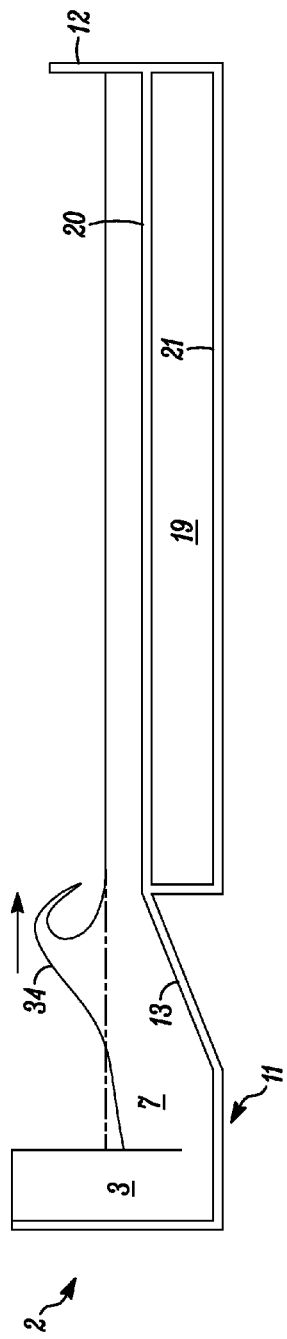
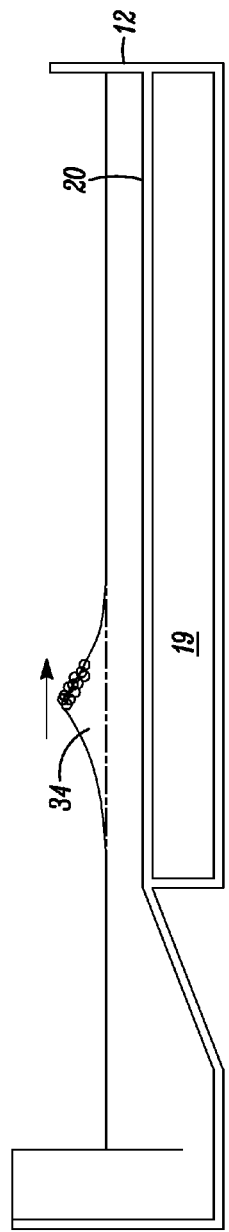
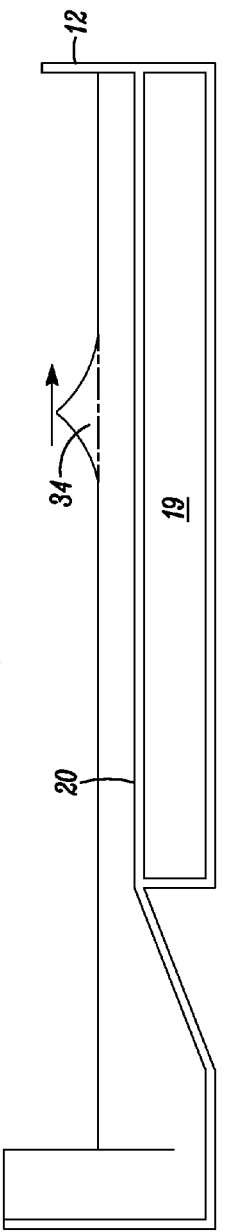
FIG. 9A
FIG. 9B
FIG. 9C

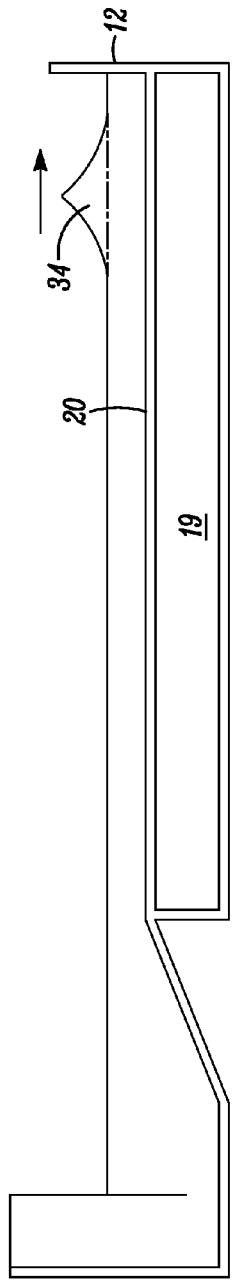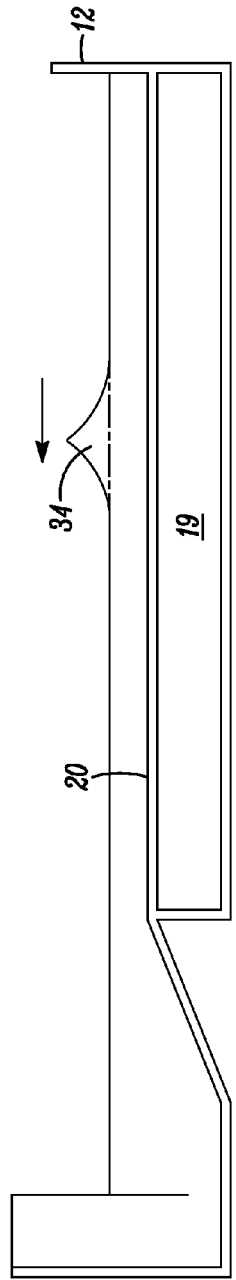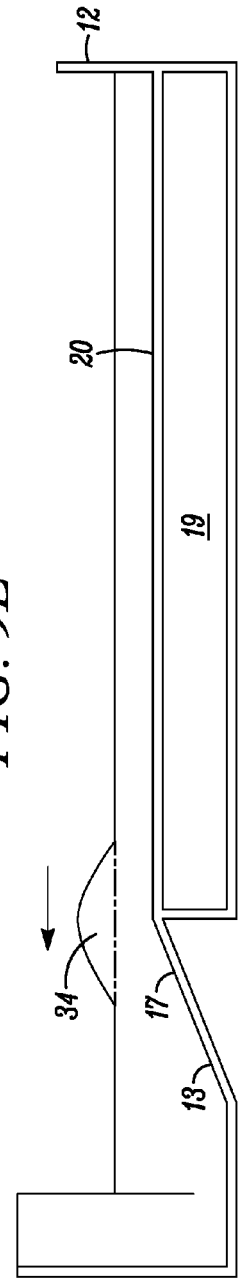

METHOD AND APPARATUS FOR DAMPENING WAVES IN A WAVE POOL

RELATED APPLICATION

This application claims priority from U.S. provisional application Ser. No. 61/200,183, filed Nov. 25, 2008.

FIELD OF THE INVENTION

The present invention relates to the field of wave pools, and in particular, to a wave pool that generates large surfing class waves that are dampened to enable increased throughput per available unit of space.

BACKGROUND OF THE INVENTION

Wave pools have become popular at water theme parks in recent years. Wave pools are man-made bodies of water in which waves are created much like waves in an ocean. A wave pool typically has a wave generating machine located at one end and an artificial sloped "beach" located at the other end, wherein the wave generating machine creates periodic waves that travel from that end to the other end. The floor of the pool near the beach end is preferably sloped upward so that as the waves approach, the sloped floor causes the waves to "break" onto the beach.

In some cases, the size and power of wave pools have been increased so that they can intermittently serve as "cross-over" wave pools capable of producing larger surfing class waves that enable special surfing events and demonstrations to be conducted, such as those involving stand-up surfing maneuvers on state-of-the-art finned surfboards. These cross-over pools, as they are so called (i.e., they serve on one hand traditional swimmer/inner-tube floaters in a choppy basin of bobbing water, and on the other hand, surfers desiring larger progressive waves that break obliquely along the beach) are typically larger and have deeper floors than conventional water theme park wave pools. The object has been, in such case, to produce larger surfing class waves to accommodate the occasional expert surfer, while at the same time, producing modest waves for the majority of the mass market bobbing inner-tube floaters and swimmers.

Such cross-over wave pools, however, have several disadvantages. First, due to the increase in the size of the waves, there is the concomitant increase in the occurrence of rip currents which can reduce the "surfable" quality of the waves, and consequently, make it more difficult for participants to perform surfing maneuvers thereon. They can also increase the attendant risks. Rip currents are often created by the water level gradients that can occur in the along-shore direction of the pool, such as in the case of a pool with an obliquely oriented sloped floor, wherein as water builds up on one side of the pool, a reverse flow of water that travels against the movement of the oncoming waves can be created down the sloped beach, i.e., as water seeks its own equilibrium. These "rip currents" tend to flow against the oncoming waves and can detrimentally affect how water and wave energy dissipate. They can also cause waves to break sooner and less dramatically, in which case, there can be more white water and mass transport of water onto the beach. The waves can also break up into sections.

A second related disadvantage of the cross-over wave pool is that wave reflections that are similar to those that exist in nature can occur. For example, wave reflections typically occur when there is an end wall at the far end of the pool, or a relatively steep beach or reef, that tends to reflect the wave energy back across the wave pool in a reverse direction, such that, as the waves progress and are reflected back, they can interfere with the next oncoming wave. On account of such reflections, a backwash can be created, which can lead to a significant decrease in surfable wave quality, which in turn, can make performing surfing maneuvers more difficult A third corollary disadvantage related to the formation of rip currents and wave reflections is the resultant reduction in the pool's productive asset value that can result from having to reduce the frequency of the waves in an attempt to reduce these unwanted movements and characteristics. Although it is usually desirable to increase the frequency of wave generation to increase the number of riders that can ride on the waves per hour (with a corresponding increase in revenue per hour using the same asset base), the downside to doing so is that the occurrence of rip currents and wave reflections can thereby increase. For example, it has been found that if surfable size waves (1.5 meter or higher) are generated every fifteen seconds or so, the likelihood is high that significant rip currents will then be created, and accordingly, when larger waves suitable for surfing are generated, it is often necessary to reduce the frequency of the waves to reduce the likelihood that these unwanted rip currents and wave reflections will occur. Therefore, an associated disadvantage that can result from the use of large cross over wave pools is that the frequency of wave generation can be reduced, i.e., such as down to one wave every minute to ninety seconds or more, in which case, the asset value of the property is reduced as well.

A fourth disadvantage is that such cross over wave pools tend to be larger and inherently more expensive to build. This is especially true when wave pools are installed in areas where land is scarce, and therefore, building larger cross-over wave pools, simply to increase wave size is not often very cost effective. Renovating an existing wave pool to make it larger also requires a significant amount of effort and expense.

A fifth disadvantage to the cross-over wave pool occurs in situations where wave pools are used to host surfing exhibitions and competitions. As discussed, because of the risks associated with making surfing waves bigger, some effort has been made to build cross-over wave pools that are sufficiently large enough to 'dilute' the rip current and wave reflection problems discussed above. For example, one way to make wave pools less reflective and reduce the occurrence of rip currents is to decrease the slope of the pool floor, which in turn, requires that the distance between where the waves break and the far end of the beach where the spectators are seated will have to be increased. Unfortunately, such a solution has the detrimental effect of forcing spectators (who are normally seated on bleachers or grandstands immediately behind the beach and above the waterline) further away from the waves, which can make it more difficult for them to see and enjoy the wave and surf action.

What is needed, therefore, is an improved and dedicated cross over surf pool design that enables larger and more frequent quality waves to be produced in a safe manner, without having to increase wave pool size, while at the same time, enabling the wave breaking characteristics to be controlled, and rip currents and wave reflections to be reduced, which would otherwise be detrimental to the formation of surfable waves.

SUMMARY OF THE INVENTION

The present invention represents an improvement over previous wave pool designs insofar as it comprises a method and apparatus for reducing detrimental wave reflections and rip currents within a wave pool by providing a wave dampening chamber preferably downstream from the breaker line that absorbs wave energy and dampens waves, wherein larger surfable quality waves can be produced within the wave pool at greater frequencies without increasing pool size or floor design hazard.

The present invention preferably comprises a wave pool with a wave generator and an obliquely oriented sloped floor that creates waves that begin to break at or near the breaker line, wherein one of the improvements provided by the present invention is a wave dampening chamber that is preferably located downstream from the breaker line, wherein the chamber preferably comprises a relatively shallow raised or "false" perforated floor extending above a relatively deep solid chamber floor, wherein the combination of the raised floor over the solid floor and the porosity of the raised floor help to cause the wave energy to be absorbed and waves to be dampened.

In general, the present wave pool can be constructed much like a large swimming pool with a bottom floor and end walls, along with side walls, preferably made of concrete or other conventional material set into the ground. A wave generating device is preferably provided at the deep end of the pool that can be used to create periodic waves that travel across the wave pool toward the opposite shallower end. The wave generating device can be any conventional type, such as those that are hydraulically, mechanically or pneumatically operated. Preferably, the device has sufficient power to create large, surfable quality waves as is known in the art.

In the wave generating end of the pool, the bottom floor preferably has a relatively horizontal section, although not necessarily so, followed downstream by an inclined section that helps to produce the breaking waves. The inclined section is preferably extended at a predetermined slope from the horizontal section upward to the breaker line, which is preferably at the break depth of the waves, wherein the slope determines the type of wave breaking action that is to occur. The inclined section is also preferably obliquely oriented and adapted such that as the periodic waves travel across the wave pool, the waves will be acted upon by the slope of the inclined section, and eventually they will break and peel obliquely toward the opposite end at the prescribed breakpoint. The inclined section is preferably sloped to optimize the size and quality of the waves depending on the type of waves that are desired—whether they are barrelling waves or spilling waves, etc., as will be discussed. The inclined section is preferably oriented obliquely at about a forty five degree angle relative to the travel direction of the waves, although this angle can vary, such as from 30 to 60 degrees or more.

One improvement provided by the present invention is the inclusion of a wave dampening chamber that is situated downstream from the inclined section, i.e., in the downstream portion of the wave pool. The wave dampening chamber preferably comprises a relatively shallow raised or "false" perforated floor that extends above a relatively deep solid chamber floor. The raised floor is preferably provided with multiple openings, or perforations, that allow a predetermined amount of water and wave energy to pass through—both up and down and through the openings—wherein the rate at which the water is allowed to pass through the raised floor in both directions is determined by its "porosity," i.e., the perforated area divided by the solid area of the raised floor. By virtue of the raised floor's porosity, and the depth of the raised floor relative to the depth of the solid floor underneath, and taking into account the height of the waves, as well as other wave characteristics and factors, the wave energy can be absorbed and dampened to a significant degree, wherein a boundary layer of energy absorbing vortices and eddies can be created both above and below the raised floor, which help to significantly reduce and eventually dissipate the oncoming waves. This in turn helps to eliminate the amount and severity of rip currents and wave reflections that can otherwise occur within the wave pool, which in turn, helps to allow the next oncoming waves to form and break properly without interference.

The wave pool of the present invention is, in some ways, constructed much like a conventional wave pool with a wave generator provided at the deep end, and a sloped floor that extends upward toward the shallow end. The wave generator in such case is preferably a conventional type that generates periodic waves that travel across the body of water from the deep end toward the shallow end, wherein the inclined floor acts upon the waves and causes the waves to flow up and build up momentum until the waves curl forward and begin to break. But instead of allowing the waves to break onto a beach or reef as in past wave pools, the inclined floor of the present invention is preferably terminated at or near the break depth, i.e., along the breaker line, and preferably, downstream from the inclined section, a wave dampening chamber is provided to help dampen and dissipate the waves, and eliminate or reduce the rip currents and adverse wave reflections that can otherwise form in the wave pool. Even with an end wall at the far end, which in an ordinary wave pool can cause unwanted wave reflections to occur, the wave dampening chamber of the present invention preferably dampens and dissipates the waves and the wave energy such that there are few if any adverse movements remaining in the waves by the time the next oncoming waves approach and are acted upon by the sloped incline.

In one aspect, the present invention represents an improvement over previous wave pool designs in that the wave dampening chamber preferably comprises a specially designed raised perforated floor that helps to absorb wave energy and therefore reduce the height of the waves (after they begin to break) and eventually dissipate so that by the time the next oncoming waves approach, the rip currents and wave reflections that could otherwise interfere with the oncoming waves are substantially diminished or non-existent. This enables the surf zone of the wave pool (upstream of the breaker line where the waves ultimately break) to be relatively free of unwanted motions, including rip currents and wave reflections, thereby helping to produce larger and better quality surfing waves at greater frequencies, and thereby, to increase throughput without increasing pool size. While in traditional wave pools, energy from a wave breaking onto the beach normally creates white water and mass transport onto the beach, the after-break zone of the present invention dampens and dissipates the waves, such that rip currents and wave reflections that normally occur in and around the surf zone are substantially reduced, and such that larger surfable quality waves can be produced at greater frequencies.

One factor that influences the extent to which the raised floor can dampen and absorb the energy of an oncoming wave is the raised floor's porosity. The term "porosity," in this sense, is defined as the perforated area of the floor divided by the solid area of the floor. Accordingly, when the porosity is zero, the floor is essentially solid, and when the porosity is one, the floor is essentially transparent.

In the present case, it has been found that the porosity of the raised floor is preferably somewhere between $0<\gamma\leq 0.5$, and more specifically, within the range of about $0.05\leq\gamma\leq 0.25$, wherein the porosity is represented by $\gamma$. This result was discovered as follows:

Initially, the inventors were asked to develop an alternative wave pool design with an adjustable (flexible) reef and were not specifically trying to develop a wave pool with a wave dampening feature. To accomplish this goal, the inventors developed a scale model of a flexible floor with multiple perforations in it, i.e., they initially constructed the floor using perforations with a low porosity of about 7%.

At first, they assumed that a low porosity floor would essentially act like a solid floor, in terms of how the water and wave energy would pass over the floor, and how the waves would progress and be affected thereby. But what they discovered to their surprise was that the waves that travelled over the perforated floor were dampened significantly and dissipated as they travelled across the floor, which was unexpected. When the inventors made this discovery, they sought to determine whether a floor having a greater porosity would dampen the waves even more, but when they tested a floor having a porosity of about 45%, they discovered to their surprise that the waves were only dampened slightly.

Based on these discoveries, the inventors sought to develop some theories regarding how waves are dampened by a perforated raised floor by testing different floors and configurations with different wave conditions. They tested a number of different configurations including floors with different porosities, slopes and depths, as well as waves having different heights, and shapes, etc., and through this process, they were able to make some rough estimates regarding the preferred levels for the specific pool configurations and wave characteristics they observed.

The inventors also developed a formula that can help mathematically estimate what the preferred porosity ranges might be for any given application, by taking into account a number of different factors, including without limitation, the breaker depth, the wave height, the pool depth, the depth of the raised floor relative to the depth of the chamber floor, the wave period, the wave length, and the shape of the wave. The inventors also learned that it is the restrictive movement of the water flowing through the perforations in both directions, i.e., water flowing up and down and through the perforations that help to determine the wave dampening characteristics of the raised floor.

Another factor discovered by the inventors that influences the wave dampening characteristics of the wave pool is the ratio between the submerged depth of the raised floor and the depth of the solid chamber floor below it. Normally, this can be expressed in terms of the distance below the raised floor (downward from the raised floor to the bottom of the solid chamber floor beneath it) relative to the distance above the raised floor (upward from the raised floor to the standing mean water level in the pool). In this respect, the preferred ratio was found to be as follows: the distance between the raised floor and solid chamber floor is preferably about two to four times (and more preferably about two and a half to three times) the depth of the raised floor beneath the standing mean water level. If this ratio is too low, which means that the raised floor is too deep relative to the solid chamber floor, there won't be enough room beneath the raised floor for the energy absorbing vortices and eddies to form and circulate properly, wherein the dampening characteristics of the raised floor can be diminished. On the other hand, if this ratio is within the preferred range, which means that the submerged depth of the raised floor relative to the depth of the solid chamber floor beneath it is within the preferred range, the wave dampening characteristics will also be preferred. Although making the ratio higher can help further increase the dampening characteristics by providing more space beneath the raised floor (in which to form the energy absorbing vortices and eddies), there comes a point of diminishing return, wherein the cost of making the chamber deeper can outweigh the benefits that can be achieved thereby.

Accordingly, in each case, there is preferably a ratio or range that provides the best dampening rate possible relative to the depth of the chamber floor and the expense needed to construct the pool with a depth of that magnitude.

Another factor to consider is that, preferably, the height of the waves propagated by the wave generator in the wave pool is greater than or equal to the depth of the raised floor beneath the standing mean water level, which is particularly true for barreling type waves. Also, to ensure that the waves form and break properly, the top of the inclined section is preferably no deeper than the breaker depth thereof since otherwise the waves may not break properly. And, the raised floor is preferably extended at the same depth as the top of the inclined section and extends substantially horizontally toward the second end. In this respect, it should be noted that it is ok for the raised floor to be shallower than the break depth, although if it is too shallow, unwanted backwash can occur.

Other factors discovered that can influence the dampening characteristics of the wave pool relate to the actual characteristics of the waves formed within the wave pool, and in particular, the wave height, wave period, wave length and breaker shape. For example, if the wave height is relatively high, which means that it has greater potential energy than a smaller wave, it can be seen that more energy will be expended when the waves break, wherein it will be more important for the porosity of the raised floor to be higher to enable sufficient water and wave energy to pass through it to effectively dampen the waves. With more wave energy, more influence on the waves will be needed, to enable the waves to be substantially dampened and dissipated.

In an alternate embodiment, the raised floor can be constructed using multiple layers of perforated sheets, wherein each is separated by a gap of a predetermined distance, and wherein each layer can have a different porosity. And, between adjacent layers, the porosity of the layer above it is preferably higher than the porosity of the layer below it. For example, when the raised floor consists of three layers, the top layer preferably has a relatively high porosity, while the middle layer has an intermediate porosity, and the bottom layer has a relatively low porosity. Other variations with different numbers of layers and porosity arrangements are also possible and contemplated.

In another alternate embodiment, the raised floor can be inclined, along with the solid chamber floor, if desired. By applying a slope to the raised floor, the dampening rate thereof can be altered in the direction that the wave travels, i.e., as the submerged depth of the raised floor changes, the dampening rate changes as well. As explained before, the raised floor preferably does not extend any deeper than the break depth, wherein the waves may not break properly in such case.

In another alternate embodiment, the porosity of the raised floor can vary downstream. For example, an upstream portion of the raised floor can have a relatively high porosity, followed by an intermediate porosity section, followed again by a section having a relatively low porosity. By creating variations in the porosity of the raised floor, the preferred porosity can be matched up with the preferred wave height at any given point along the raised floor, i.e., as the waves break and begin to diminish, the porosity of the downstream portion can be made to be lower to account for the lower energy that will be expended by the waves. This way, as the waves travel over the wave dampening chamber and progress, the porosity can be lowered to better accommodate the lower wave height conditions that will exist downstream as the waves dissipate. The actual porosity at any given location can vary but the porosity range is preferably within the same regime discussed previously.

BRIEF DESCRIPTION OF THE DRAWINGS

FIGS. 8a, 8b, 8c, 8d, 8e and 8f comprise a series of six drawings showing a single wave travelling across the wave pool of the present invention with the wave dampening chamber having a preferred porosity, wherein the wave breaks at or near the breaker line and begins to dissipate as it makes its way across the wave dampening chamber (arrows denote wave direction), wherein the wave shape and height distribution indicates that over time the wave will eventually dissipate after it is reflected back from the end wall;

FIGS. 9a, 9b, 9c, 9d, 9e and 9f comprise a series of six drawings showing a single wave travelling across the wave pool of the present invention (arrows denote wave direction) with the wave dampening chamber having a porosity of zero, which is essentially a solid raised floor, wherein the wave breaks at or near the breaker line and as it continues across the wave dampening chamber it reduces only slightly in height, and then, as it reflects off the far end wall, the wave continues to travel at substantially the same height and shape;

DETAILED DESCRIPTION OF THE INVENTION

Figure 1:
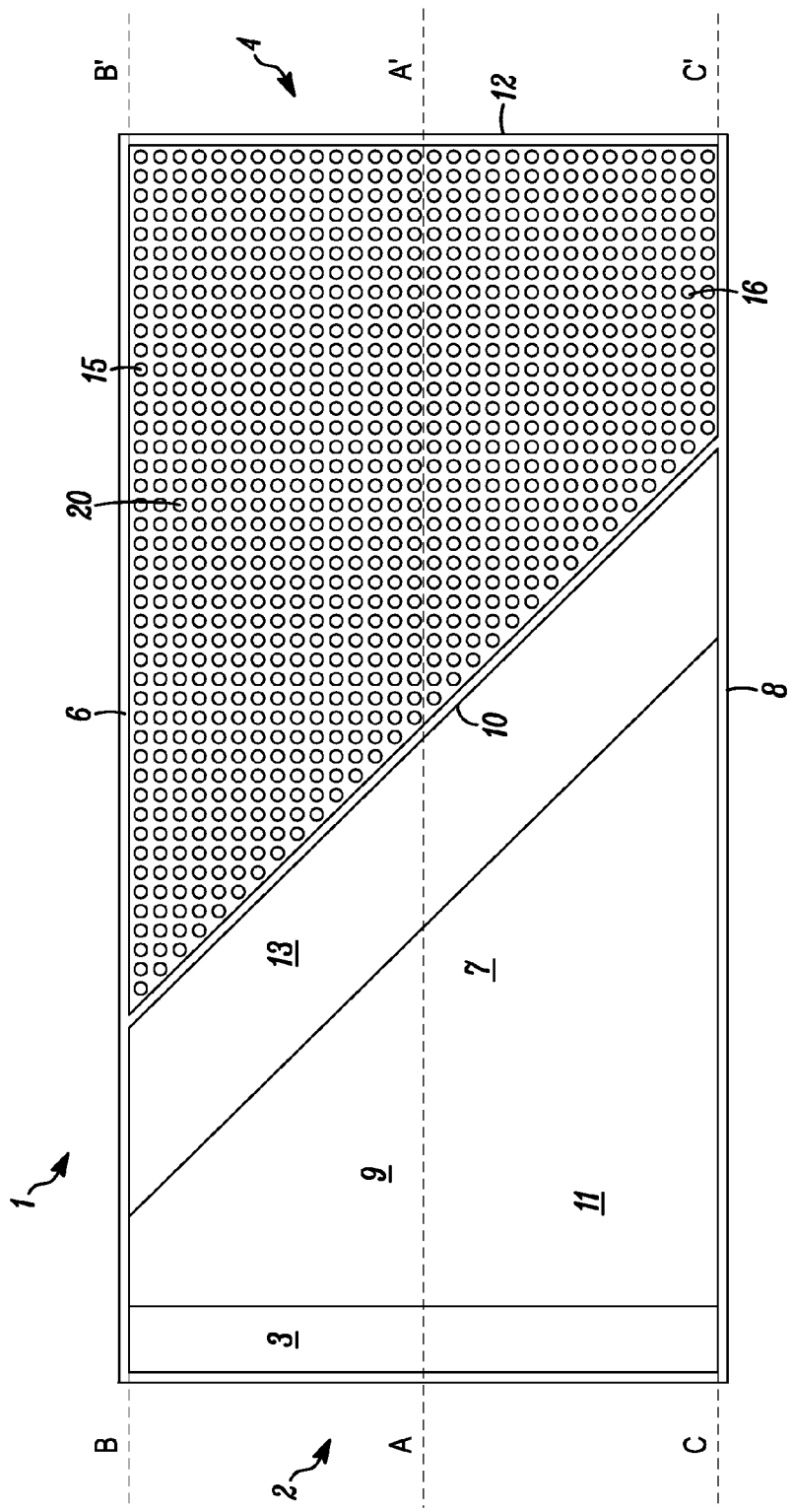
FIG. 1 is a plan view showing an embodiment of the wave pool of the present invention with a horizontal floor section followed downstream (from left to right) by an obliquely oriented inclined section and a wave dampening chamber with a perforated raised floor after the breaker line.
Figure 2:
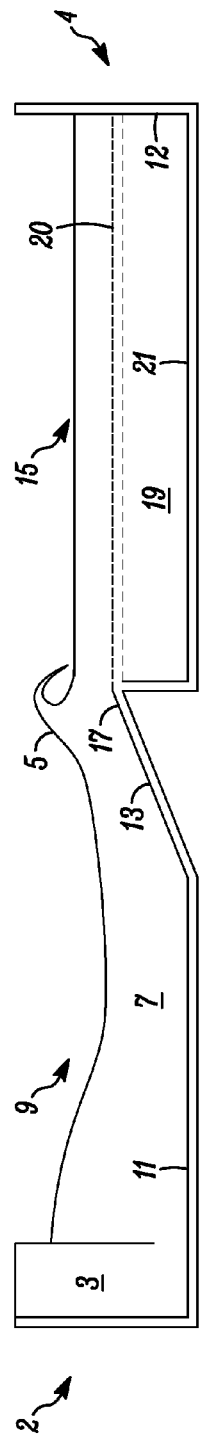
FIG. 2 is a cross-section taken along section A-A of FIG. 1 showing the wave generator at the far left end, followed downstream (left to right) by the horizontal floor section and the inclined section, and then, the wave dampening chamber with the perforated raised floor after the breaker line.
Figure 3:
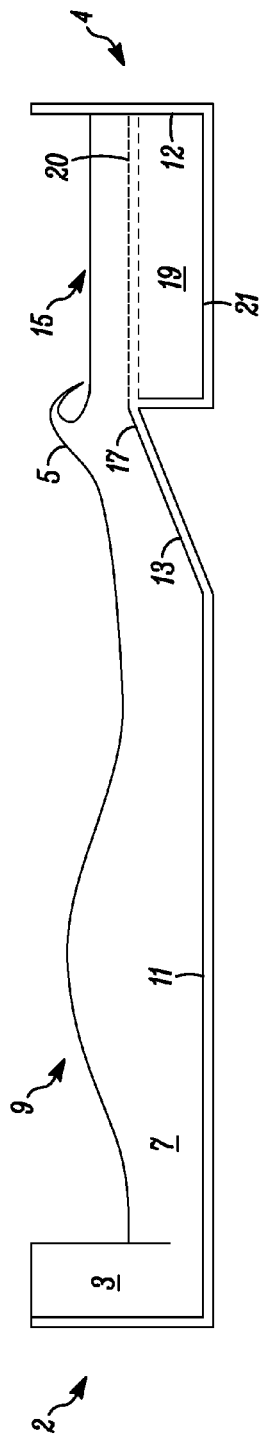
FIG. 3 is a cross-section taken along section C-C of FIG. 1 showing the wave generator at the far left end, followed downstream (left to right) by the horizontal floor section and the inclined section, and then, the wave dampening chamber with the perforated raised floor after the breaker line.
Figure 4:
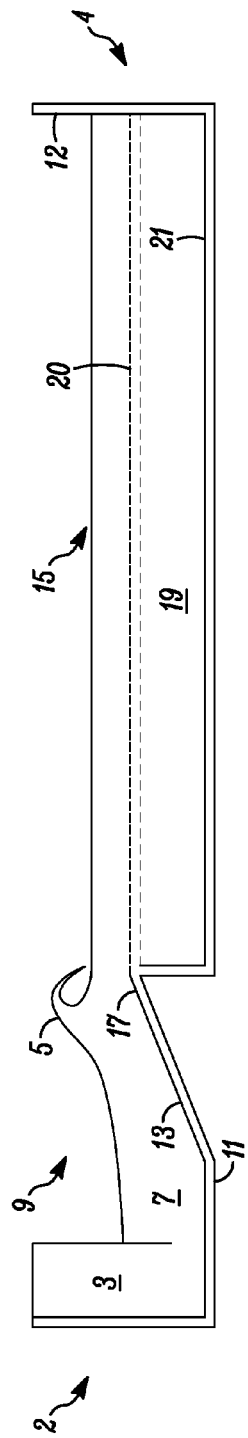
FIG. 4 is a cross-section taken along section B-B of FIG. 1 showing the wave generator at the far left end, followed downstream (left to right) by the horizontal floor section and the inclined section, and then the wave dampening chamber with the perforated raised floor after the breaker line.

FIG. 1 is a plan view and FIGS. 2-4 are section views showing an embodiment of wave pool 1 of the present invention preferably having a first end 2 (shown on the far left end of FIGS. 1-4) and second end 4 (shown on the far right end of FIGS. 1-4). Preferably, wave pool 1 is constructed much like a large swimming pool with a bottom floor and end walls, along with side walls, preferably made of concrete or other conventional material set into the ground. Preferably extended along one side (shown along the top of FIG. 1) is a first side wall 6 and preferably extended along the opposite side (shown along the bottom of FIG. 1) is a second side wall 8. Second end 4 preferably comprises an end wall 12, although embodiments with a sloped beach, reef or shoreline extending along second end 4 are also contemplated. In plan view, wave pool 1 is preferably rectangular in shape, although not necessarily so, i.e., the side walls can also be angled.

In the preferred embodiment, one or more wave generators 3 is/are preferably located at first end 2 which is/are capable of releasing energy and/or a mass flow of water into body of water 7 within wave pool 1 sufficient to create a periodic wave 5 (shown in FIGS. 2-4) that travels through body of water 7 and across wave pool 1. Wave generator 3 can be any conventional type such as those that are mechanically, hydraulically or pneumatically operated, as is known in the art. Preferably, wave generator 3 has sufficient power to create large, surfable quality waves that travel across wave pool 1.

Wave pool 1 preferably comprises a first upstream wave forming portion 9 preferably comprising a substantially horizontal floor 11 followed downstream by an inclined section 13 that acts upon the waves 5 to cause them to begin breaking, i.e., along or near a breaker line 10 shown in FIG. 1. In FIGS. 1-4, "downstream" refers to the direction that extends from first end 2 to second end 4, i.e., from left to right in those drawings. Horizontal floor 11 is preferably extended substantially horizontally for a predetermined distance downstream from first end 2, wherein inclined section 13 preferably begins to slope upward, wherein inclined section 13 is preferably obliquely oriented relative to the travel direction of waves 5, and therefore, the distance that horizontal floor 11 extends downstream will depend on how far downstream inclined section 13 extends, which differs on different sides of wave pool 1. For example, in the embodiment shown in FIG. 1, the shortest distance that extends between first end 2 and inclined section 13 is along first side wall 6 (along section B-B) and the furthest distance that extends between first end 2 and inclined section 13 is along second side wall 8 (along section C-C). Preferably, the shortest distance that extends along horizontal floor 11 between first end 2 and inclined section 13 is about twenty to twenty five feet, which can occur along first side wall 6, which enables waves 5 of sufficient size and magnitude to develop and propagate before being affected by inclined section 13, i.e., horizontal floor 11 preferably extends at least twenty to twenty five feet to enable a wave having a height of four to five feet to develop properly. This distance can be shorter or longer depending on the desired wave height for any given application. Although horizontal floor 11 is preferably substantially horizontal, the present invention contemplates that horizontal floor 11 can be provided with a slight slope without departing from the invention, i.e., the tolerance would allow horizontal floor 11 to begin with a very gradual upward slope that increases over the distance of pool 1, or a gradual downward slope that begins to slope upward over the distance of pool 1, etc.

In any event, inclined section 13 is preferably sloped so that it can act upon waves 5 to cause them to begin breaking and spilling forward as they travel across wave pool 1, wherein the slope of inclined section 13 determines the nature and character of the breaking waves that are formed, i.e., whether they are spilling waves or barreling waves, etc. Inclined section 13 is preferably sloped to optimize the size and quality of the waves such that waves suitable for surfing can be produced.

For surfing purposes, slope characteristics are well known in the art, such as those described in "Surf Similarity," by Battjes, "Artificial Surf Reefs," by Henriquez, and "Classification of Surf Breaks in Relation to Surfer Skill," by Hutt, which are incorporated herein by reference. For example, when the slope is relatively gentle, such as under 5%, a spilling wave can be formed, whereas, when the slope is steeper, such as between 5% and 10%, a barreling wave will typically be created. When the slope is higher, the tendency is for a Teahupoo wave to be created.

For these reasons, the slope of inclined section 13 is preferably somewhere between about 1% and 10% (in the direction that the wave travels) depending on the type of wave that is desired to be created. For example, to create a spilling wave with a wave period of about eight seconds, the preferred slope of inclined section 13 is about 5% or less, although the actual slope may depend on the desired wave height and wave length (wherein the wave length depends on the wave period and pool depth). On the other hand, to create a barreling wave with a wave period of about fifteen seconds, the preferred slope of inclined section 13 is between about 5% and 10%, although again, the actual slope may ultimately depend on the desired wave height and wave length (wherein the wave length depends on the wave period and pool depth).

The preferred depth of horizontal floor 11 in first wave forming portion 9 (designated as "Pool depth" in FIG. 5 and otherwise designated as $d_{pool}$ or Dp throughout) is dependent on a number of factors as will be discussed. For now, suffice it to say that the Pool depth or $d_{pool}$ of horizontal floor 11 is preferably about three times the desired height of the wave to be propagated in wave forming portion 9. And because the wave height for purposes of surfing is preferably between about three feet to eight feet, the depth of horizontal floor 11 or $d_{pool}$ is preferably about nine feet to twenty four feet depending on the actual size of the waves to be produced.

This being the case, it can be seen that the depth of horizontal floor 11 and slope of inclined section 13 will together determine the length that inclined section 13 has to extend in the direction the waves travel before it reaches its maximum height which is preferably at the breaker depth—the point at which the waves will begin to break and continue to move forward. For example, if the depth of horizontal floor 11 is nine feet, and the slope of inclined section is 10%, and the breaker depth is three feet, the length of inclined section 13 would necessarily be about sixty feet (this is based on a slope ratio of one to ten, and ten multiplied by the delta depth of six feet). Likewise, if the depth of horizontal floor 11 is twenty four feet, and the slope of inclined section is 5%, and the breaker depth is eight feet, then, the length of inclined section 13 will be about three hundred and twenty feet (this is based on a slope ratio of one to twenty and twenty multiplied by the delta depth of sixteen feet). For these reasons, it can be seen that the size and length of inclined section 13 in pool 1 will depend to a large degree on whether the wave pool 1 is designed to create barreling waves or spilling waves. For this reason, it has been found that from a construction cost standpoint it is often more desirable to build wave pools with steeper inclined sections that produce barreling type waves rather than gentler inclined sections to produce spilling type waves.

It should be noted that because inclined section 13 is preferably obliquely oriented relative to the travel direction of the waves, the actual length of inclined section 13 from one end to the other is actually longer than the distance of inclined section 13 at any given cross section. In the first example above, even if inclined section 13 begins to slope upward at twenty feet from first end 2 (along first side wall 6), inclined section 13 may not begin to slope upward until a hundred and twenty feet from first end 2 on the opposite side (along second side wall 8). And, the extent to which this is so will depend on the oblique angle of the inclined section and the overall width of wave pool 1.

For example, if wave pool 1 is fifty feet wide, and the angle of obliqueness is forty-five degrees, it can be seen that inclined section 13 will begin to slope upward fifty feet further downstream along second side wall 8 than along first side wall 6. This being the case, in the example above, the actual length of inclined section 13 (in the direction that the wave travels) will be about one hundred and ten feet, i.e., sixty feet plus fifty feet, to take into account the oblique angle of the inclined section. It should, however, be seen that wave pools having a floor with a continuous slope rather than a horizontal floor followed by an inclined section are contemplated, in which case, the length and size of the pool could be reduced to some extent.

Of course, as will be discussed in more detail below, one of the objects of the present invention is to dampen the waves that are generated in wave pool 1 as they spill or break toward second end 4, so preferably, inclined section 13 is terminated well before it reaches the standing mean water level in the pool. In fact, preferably, inclined section 13 is terminated at the break depth of the slope of inclined section 13. In this respect, to help ensure that the waves break properly before they are dampened by wave dampening chamber 19, inclined section 13 is preferably extended upward a sufficient distance downstream from first end 2, wherein it preferably terminates at the break depth, which in most cases, is the depth that extends along breaker line 10.

This point or depth can be estimated/determined mathematically by taking into account a number of factors as is known in the art, including the wave length, wave period, wave height, pool depth, slope of incline, wave shape, etc. Generally speaking, the following calculations are necessary to estimate/determine the break depth for a given wave: The breaker depth index (ratio between Breaker height and breaker depth) is defined as:

$$\gamma_b = \frac{H_b}{d_b}, \quad (1)$$

where $H_b$ is the wave height at breakpoint and $d_b$ is the water depth at break point. In order to calculate the breaker depth index we can use the following formula:

$$\gamma_b = b - a\frac{H_b}{gT^2}, \quad (2)$$

where g is the gravitational constant, T is the wave period, $$a = 43.8(1 - e^{-19\tan\beta}) \quad (3)$$

and $$b = \frac{1.56}{(1 + e^{-19.5\tan\beta})}, \quad (4)$$

where β is the slope of the reef. Then we find the breaker depth according to (1), $$d_b = \frac{H_b}{\gamma_b}.$$

These calculations are valid with slopes of up to about 10%.

With the known wave height, wave period and pool depth (of horizontal floor 11), one can determine the wave length, and with the known wave length, wave height and slope of inclined section 13, one can determine the breaker shape (Iribarren), and with the known breaker shape and wave height, one can determine the breaker depth (dbreak). Nevertheless, these calculations are intended to provide estimates of the preferred breaker depths, wherein model tests would still need to be performed to ensure that these estimates are accurate. For a complete discussion of the determination of the breaker depths, reference is made to the Coastal Engineering Manual published by the U.S. Army Corp of Engineers, which is incorporated herein by reference, and in particular, Chapter Four entitled "Surf Zone Hydrodynamics."

Another way to help reduce the overall length of inclined section 13 and therefore the size of wave pool 1 is to provide a relatively steep incline followed by a relatively gentle slope further downstream. To do this, in an alternate embodiment, the first upstream portion of inclined section 13 can be steeper, such as about 10% to 30%, and the remainder of the incline can be about 1% to 10%. For example, in the example above, if the overall slope of inclined section 13 is 10%, then the initial ten feet portion of the incline can be increased to a slope of 30%, wherein, the total length of inclined section 13 can then be reduced from about sixty feet down to about forty feet, i.e., inclined section 13 rises three feet during the first ten feet of distance, and then it would rise an additional three feet during the next thirty feet of distance, wherein the incline would terminate at the break depth of three feet. It should be noted that FIGS. 1-5 are not to scale in the sense that they do not show the actual slope of inclined section 13, nor do they show the slope transitioning from being relatively steep, i.e., 20% to 30%, to being relatively gentle, i.e., 1% to 10%.

The preferred configuration of horizontal floor 11 or wave forming portion 9 of pool 1 and inclined section 13 help to produce waves that are desirable for surfing. And because inclined section 13 is obliquely oriented relative to first and second side walls 6, 8, respectively, any wave that forms within wave forming portion 9 will begin to break sooner along first side wall 6 than along second side wall 8. Conversely, for the same reasons, any wave that forms within wave forming portion 9 along the opposite side wall 8 will begin breaking further downstream. Accordingly, the oblique configuration of inclined section 13 generally creates a periodic wave 5 that tends to peel obliquely and progressively as it moves forward through body of water 7, wherein the wave will eventually break at an angle as it moves forward along breaker line 10. And, as will be discussed later in connection with FIGS. 11-13, as the waves break, a current pattern will begin to form that will cause water to flow in the along shore direction, wherein this movement can cause additional currents to form, such as unwanted rip currents and wave reflections, wherein one of the main objectives of the present invention is to reduce the degree to which these currents and movements are formed.

One improvement provided by the present invention is the inclusion of a second portion 15 comprising a wave dampening chamber 19 that extends substantially downstream from inclined section 13 as seen in FIGS. 1-4. Wave dampening chamber 19 preferably comprises a lower solid chamber floor 21 having a predetermined depth, and a raised or "false" perforated floor 20 that extends substantially above it, wherein chamber 19 is preferably extended between side walls 6, 8, and between inclined section 13 and end wall 12. Raised floor 20 is preferably extended substantially horizontally over chamber floor 21, although not necessarily so, and across wave dampening chamber 19 at a predetermined depth relative to the standing mean water level within pool 1. Raised floor 20 is preferably located at the break depth of the pool 1, taking into account a number of factors, as will be discussed, and is preferably made of a material that is sufficiently rigid and strong, such as steel, fiberglass, Kevlar, or high carbon fibers, etc., to support the weight of participants walking thereon, and is preferably smooth and coated or made of a material that prevents rust that will not cause injury to participants in their bare feet. Raised floor 20 is preferably supported by any conventional means, such as beams extending across the length and/or width of wave dampening chamber 19. In alternate embodiments, raised floor 20 can be provided with multiple layers, each having a different porosity, and/or with differing/changing porosities as it extends downstream, as will be discussed. It can also be inclined rather than horizontal.

Raised floor 20 preferably has perforations 16 of a predetermined size, shape and proliferation or density. The preferred shape of perforations 16 is circular or oval, although any shape that performs in the desired manner is contemplated. The size of each opening and the number of openings per unit area of raised floor 20 will depend on the desired porosity of raised floor 20. The porosity of raised floor 20 is essentially equal to the area of the openings divided by the area of the solid portions of floor 20. Accordingly, it can be seen that a raised floor having a porosity of zero is essentially a solid floor, whereas, a raised floor having a porosity of 1.0 is essentially a transparent floor. The preferred porosity range of raised floor 20 contemplated by the present invention is within the regime 0<porosity≤0.50 although the actual range is probably more like 0.05<porosity≤0.25 depending on the desired conditions. More about how the porosity and other factors can affect the dampening rate of wave dampening chamber 19 will be discussed later. Suffice it to say at this point that when the raised floor 20 has a preferred porosity (as well as other conditions), water above raised floor 20 is allowed to pass through the perforations in a preferred manner, wherein multiple energy absorbing eddies and vortices can be created above and below raised floor 20 sufficient to reduce wave energy and dampen the waves.

Figure 5:
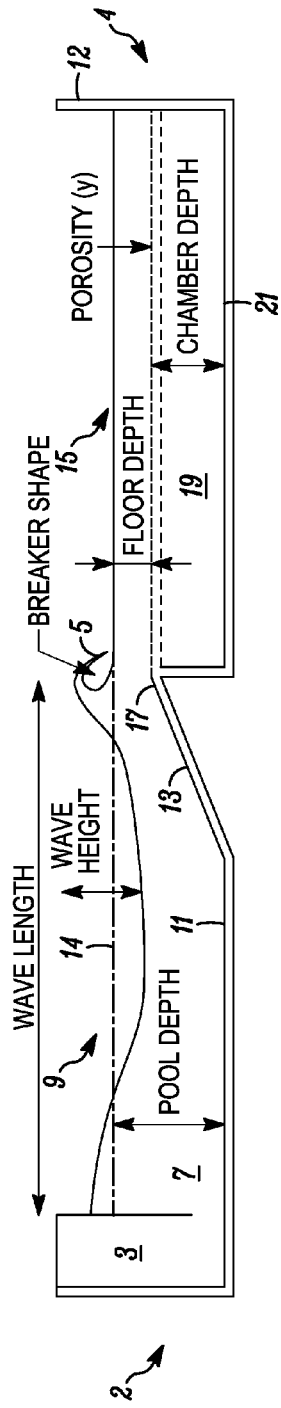
FIG. 5 is a cross-section taken along section A-A of FIG. 1 showing the wave generator at the far left end, followed downstream (left to right) by the horizontal floor section and the inclined section, and then the wave dampening chamber with the perforated raised floor after the breaker line, wherein the various design parameters relevant to the dampening rate of the wave dampening chamber are identified.

For a better understanding of how the dampening rate is affected by various configurations and factors associated with wave pool 1, including the porosity of raised floor 20, reference is now made to FIG. 5 which is a cross section of wave pool 1 showing the following parameters that are pertinent to the wave dampening rate: 1) the standing mean water level 14 of the pool (shown as a dashed line), 2) the depth of horizontal floor 11 beneath the standing mean water level 14 designated as "Pool depth" or $d_{pool}$, 3) the height of wave 5 created by wave generator 3 above the standing mean water level 14 designated as "Wave height" or H, 4) the length of wave 5 designated as "Wave length" or L, 5) the depth of raised floor 20 relative to the standing mean water lever 14 designated as "floor depth" or $d_{floor}$, (which in the preferred embodiment is equal to the breaker depth as discussed), 6) the depth of wave dampening chamber 19 beneath raised floor 20 (which is the distance between raised floor 20 and solid chamber floor 21) designated as "Chamber depth" or $d_{chamber}$, 7) the wave breaker shape designated as iribarren ($\xi_b$), and 8) the porosity of raised floor 20 designated by the symbol γ.

Each of these factors is pertinent to the determination or calculation of the dampening rate of wave dampening chamber 19 and in particular raised floor 20 as determined by the characteristics of wave pool 1 and the waves that it creates. More specifically, it has been determined that the dampening rate K of wave dampening chamber 19 depends on the following factors: (1) the porosity of raised floor 20 (γ), (2) the ratio of the submerged depth of raised floor 20 relative to the depth of wave dampening chamber 19 beneath raised floor 20 ($d_{floor}/d_{chamber}$), (3) the incident wave height relative to the depth of horizontal floor 11 ($H/d_{pool}$), (4) the wave length (L), (5) the wave period (T), and (6) the breaker shape iribarren ($\xi_b$). In such case, the dampening rate can be estimated based upon the above mentioned parameters and according to the following altered complex dispersion relation:

$$K = F\left(\gamma, \frac{d_{floor}}{d_{chamber}}, \frac{H}{d_{pool}}, L, T, \xi_b\right)$$

where K is the complex wave number ($K=K_r+iK_i$), and wherein the imaginary part $K_i$ represents the dampening rate. This equation can be solved numerically by the Newton Raphson method as is known in the art.

The goal here is to design a wave pool that can produce a wave having a height and shape suitable for surfing, but which can also achieve the preferred dampening rate, such that detrimental rip currents and wave reflections can be avoided, wherein the wave pool can be made smaller and more compact while at the same time allow for an increase in wave frequencies and therefore a higher degree of return on the asset value of the property. Not only can the reduction in wave pool size result in less construction cost, but the reduced water movements can enable waves to be created at greater frequencies, without creating undesirable wave effects and water movements in the pool, wherein more waves per unit of time can result in greater throughput.

It should be noted at the outset that the above formula only partially explains the phenomenon that occurs when a periodic wave encounters the raised perforated floor, insofar as the formula does not take into account the progressively changing height and shape of the wave as it progresses across the wave dampening chamber. That is, the formula only takes into account the wave properties that exist when the wave first enters into the wave dampening chamber, and does not take into account changes in the effective dampening rate caused by the reduction in wave height and change in wave shape as the wave travels across the pool, as well as how the porosity of the floor might affect the dampening rate at any given point as the wave is reduced incrementally.

Figure 6:
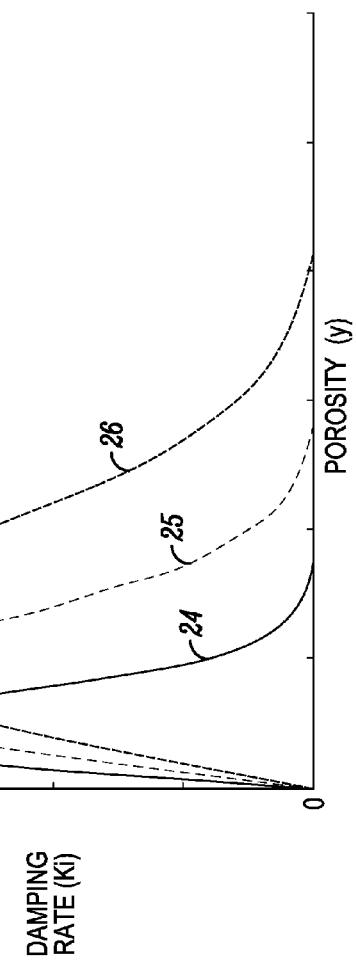
FIG. 6 is a chart showing variations of the complex wave number $K_i$ (the dampening rate) versus the porosity for three different initial wave heights, wherein the peak dampening rate occurs at various porosities depending on the height of the wave.

Various factors are involved in estimating the dampening rate in this manner. In this respect, FIG. 6 shows that when waves of differing heights are generated within wave pool 1, the preferred porosity of raised floor 20 that produces the preferred wave dampening characteristics differ. Stated differently, the preferred porosity for any given raised floor 20 that provides the preferred dampening rate is dependent on the height of the wave that raised floor 20 is designed to dampen. Accordingly, when constructing any wave pool 1, it is important to determine the nature and character of the waves that the wave pool is being designed to create before selecting the appropriate design.

In this respect, in FIG. 6, it can be seen that the variation of the complex wave number $K_i$ (the dampening rate) is plotted versus the porosity for three different initial wave heights 24, 25 and 26. The wave heights in this case are generally represented by the ratio $H/d_{pool}$, which is the wave height (H) divided by the depth of horizontal floor 11 or Pool depth ($d_{pool}$). It can be seen that in this case the three different wave heights that are plotted are represented by three different lines, wherein solid line 24 (designated as $H1/d_{pool} 1$) represents a wave that is shorter in height than the wave represented by dashed line 25 (designated as $H2/d_{pool} 2$), and dashed line 25 (designated as $H2/d_{pool} 2$) represents a wave that is shorter in height than the wave represented by broken solid line 26 (designated as $H3/d_{pool} 3$). Only relative comparisons are shown—no actual values are provided. For these reasons, it can be seen that when the wave height is relatively low, i.e., as designated by solid line 24 or $H1/d_{pool}$ 1, the preferred dampening rate can be achieved when raised floor 20 has a relatively low porosity, i.e., such as around 0.05 to 0.10, depending on the actual conditions of the waves/pool. On the other hand, when the wave height is relatively high, i.e., as designated by the broken solid line 26 or $H3/d_{pool}$ 3, it can be seen that the preferred dampening rate is achieved when raised floor 20 has a relatively high porosity, such as around 0.15 to 0.30, again depending upon the actual conditions. Also, when the wave height is in an intermediate range, i.e., as designated by dashed line 25 or $H2/d_{pool}$ 2, it can be seen that the preferred dampening rate is achieved when raised floor 20 has an intermediate porosity, such as around 0.10 to 0.20, again depending upon the actual conditions. For purposes of these examples, the other conditions $d_{floor}/d_{chamber}$, L, $\xi_b$ and are assumed to be constant.

Figure 18:
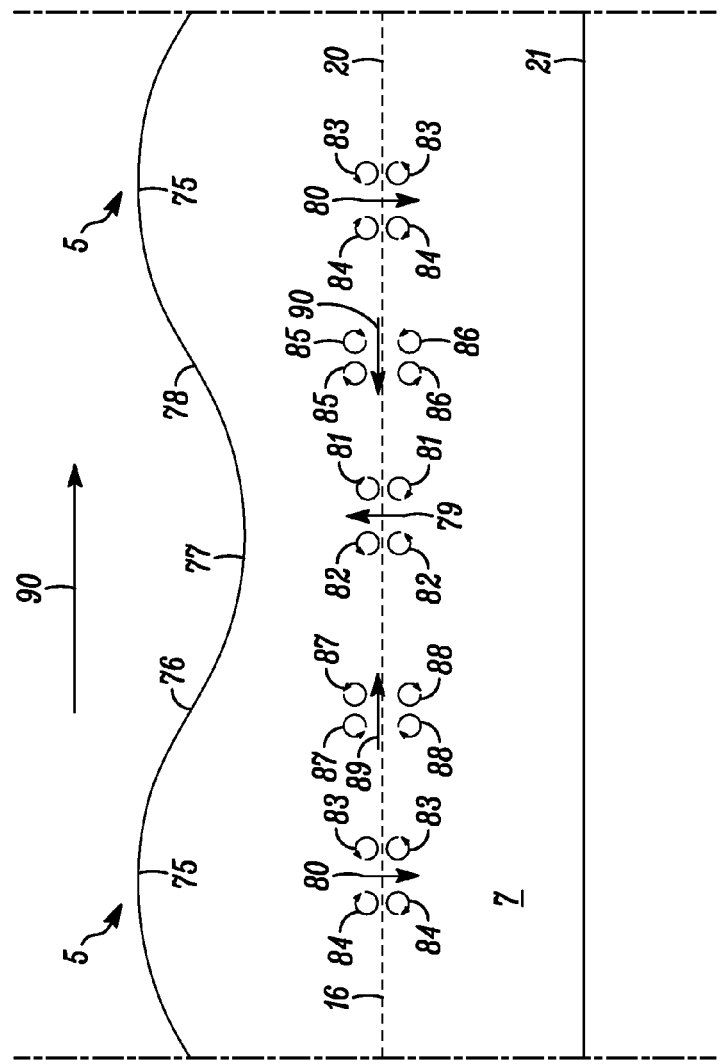
FIG. 18 is a cross section view showing waves being propagated over the wave dampening water chamber of the present invention and in particular the raised floor, wherein energy absorbing eddies and vortices are shown being formed above and below the raised floor resulting from the varied conditions created by the waves.

FIG. 6 also shows that with respect to each wave height the dampening rate increases from zero to a maximum value and then decreases back down to zero as the porosity increases from zero to the preferred porosity and further up to one, wherein the preferred porosity occurs at the maximum dampening rate. This can be explained as follows: When the porosity of raised floor 20 is zero (0.0), which is essentially a solid floor, no boundary layer eddies or vortices are formed and thus no energy is dissipated regardless of the height of wave 5. Likewise, when the porosity is too high, i.e., such as when it is closer to 1.0, which is when raised floor 20 is nearly transparent, it can be seen that no wave energy is dissipated at all regardless of the height of wave 5. But when the porosity of raised floor 20 is in the preferred range, which corresponds to when the dampening rate is at its maximum rate (which again is a function of wave height), water is then allowed to pass through the perforations in a preferred manner, wherein energy absorbing vortices and eddies are created above and below the raised floor 20, as shown in FIG. 18, sufficient to reduce wave energy and dampen and dissipate the waves. When the porosity is in the preferred range, i.e., close to the value for which the vortex formation reaches a maximum value, it can be seen that the dampening rate and therefore the energy losses associated with raised floor 20 becomes maximized.

In this respect, in order for raised floor 20 to effectively dampen the waves, the porosity ($\gamma$) is preferably within the regime of $0<\gamma\leq0.50$, although many factors including wave height and the other factors discussed above are preferably taken into account to determine the preferred porosity for any given application. And, when taking into account these considerations, it has been found that the preferred porosity regime that would result in the maximum dampening rates being achieved across a broad spectrum of conditions would generally be in the range of about 0.05 to 0.25, again depending on the wave height and the other factors and considerations discussed herein.

Figure 7:
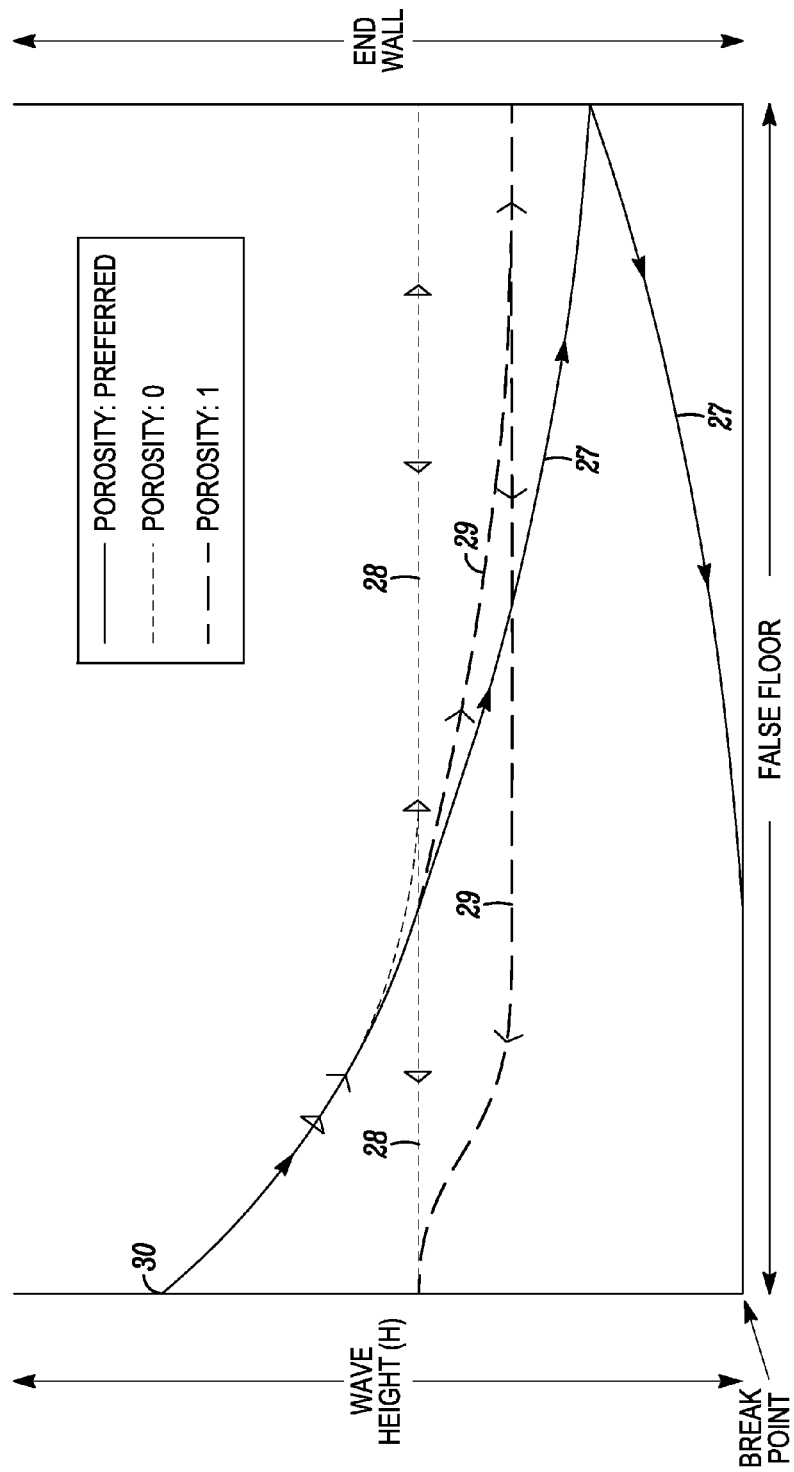
FIG. 7 is a chart comparing the wave height distribution of a wave travelling over three different perforated raised floors having three different porosities, wherein when the floor has a preferred porosity the wave height eventually reaches zero (shown by the solid line and black arrows)

FIGS. 7 to 10 show that the porosity of raised floor 20 can have a significant impact on the wave dampening characteristics of wave pool 1. For example, FIG. 7 shows a chart that compares three different waves travelling over three different raised floor 20 configurations with three different porosities. What is shown is that when the porosity is a preferred amount, i.e., the solid line, the waves are significantly dampened and wave height eventually reaches zero (as the wave reflects off end wall 12, whereas, when the porosity is too high or too low, the waves are not dissipated but instead continue at substantially the same height along their normal course.

In this case, the three different resultant wave heights are represented by the three lines (solid 27, dashed 28 and broken solid 29) verses the progress that the waves make as they travel across raised floor 20, wherein the left side represents the height of the waves when they enter into wave dampening chamber 19, and the right side represents the height of the waves when they hit end wall 12, and the arrows show the direction that the waves travel, including reverse arrows that show each wave reflected back in a reverse direction across wave dampening chamber 19.

Each of the three lines 27, 28 and 29 represents a wave subject to different porosity conditions travelling forward and making its way across wave dampening chamber 19, wherein each wave is eventually reflected back by end wall 12 and travels in a reverse direction back across wave dampening chamber 19. The following three conditions are shown:

First, solid line 27 (with solid black arrows) represents a wave travelling across wave dampening chamber 19 when the porosity of raised floor 20 is in the preferred range. Note that the vertical height of line 27 begins on the far left side 30 at its peak, and gradually and continuously drops down, indicating that the wave is being dampened, and diminished and reduced in height. Also note that line 27 continues to drop as it strikes end wall 12 and reflects back, wherein eventually the wave height reaches zero, i.e., at the bottom, indicating that the wave has completely dissipated. This represents the significant dampening effect created by raised floor 20 when the porosity is in the preferred range.

Second, dashed line 28 (with blank arrows) represents a wave travelling across wave dampening chamber 19 when the porosity of raised floor 20 is zero, which is effectively a solid raised floor. Note that the vertical height of line 28 begins on the far left side 30 at its peak, and that the height of the wave initially drops down in substantially the same manner as before with solid line 27, but because the porosity is not ideal, as the wave continues to progress, it drops down in height only slightly, and then ends up staying at about the same height all the way across wave dampening chamber 19, i.e., it becomes a horizontal line. In this respect, it can be seen that line 28 quickly levels out and becomes completely horizontal indicating that the wave height remains substantially the same throughout its course across wave dampening chamber 19. Even after the wave is reflected back, the wave remains undampened and un-dissipated.

Third, broken solid line 29 (with line arrows) represents a wave travelling across wave dampening chamber 19 when the porosity of raised floor 20 is one, which is effectively a transparent raised floor. Note that the vertical height of line 29 begins on the far left side 30 at its peak, and that it initially reduces in height in substantially the same manner as before. But in this case, even though the wave height drops down slightly, i.e., a little more than line 28, because the porosity is still not ideal, the wave ends up staying about the same height across the remainder of wave dampening chamber 19. Like dashed line 28, broken solid line 29 also eventually levels out and becomes substantially horizontal as the wave is reflected back in a reverse direction. This also shows that the wave eventually increases in height as it travels back over top 17 of inclined section 13.

Figure 10A:
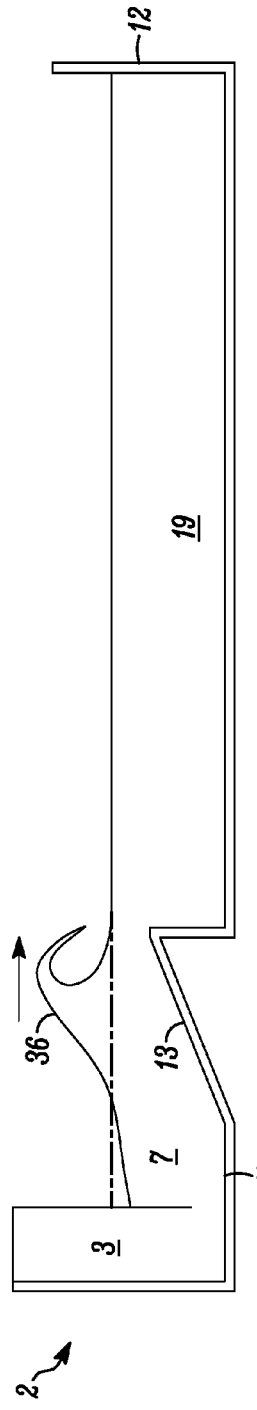
FIGS. 10a, 10b, 10c, 10d, 10e and 10f comprise a series of six drawings showing a single wave travelling across the wave pool of the present invention (arrows denote wave direction) with the wave dampening chamber having a porosity of one, which is essentially a transparent floor, wherein the wave breaks at or near the breaker line and turns into a non-breaking swell that continues across the wave dampening chamber, wherein over time, the swell continues and reflects off the far end wall, wherein the swell continues to travel in substantially the same manner with little change in shape or height.

The above three conditions are also graphically shown in FIGS. 8a, 9a and 10a, and each drawing in those sets, wherein each set of drawings shows the same wave entering into wave dampening chamber 19, but because each raised floor 20 shown in the different sets is provided with a different porosity, the dampening effect caused by the wave dampening chamber 19 in each case differs. Each set of drawings referred to above contains six drawings representing snap shot views of the same wave as it progresses across wave dampening chamber 19 and over raised floor 20—FIGS. 8a, 8b, 8c, 8d, 8e and 8f show what happens to a wave when raised floor 20 has a preferred porosity, FIGS. 9a, 9b, 9c, 9d, 9e and 9f show what happens to a wave when raised floor 20 has a porosity of zero, and FIGS. 10a, 10b, 10c, 10d, 10e and 10f show what happens to a wave when raised floor 20 has a porosity of one.

As shown in FIG. 8a, wave 32 begins to break and enter into wave dampening chamber 19 on the far left side, wherein by the time wave 32 has moved close to the breaker line 10, it has begun to curl and break forward. And as wave 32 begins to travel over raised floor 20, as shown in FIG. 8b, it can be seen that wave 32 has stopped curling and a crest of white water has begun to form on top. And because the porosity of raised floor 20 is preferred, FIG. 8c shows that as wave 32 continues to travel across raised floor 20, it continues to shrink in size, i.e., by the time it has moved about two thirds of the way across raised floor 20, the wave height is significantly less that it was when it entered into chamber 19. FIG. 8d shows that by the time wave 32 is about to strike end wall 12, it has shrunk even further, wherein the wave 32 has actually begun to flatten out considerably. FIG. 8e shows that by the time the wave 32 has reflected off of end wall 12, and has reached about half way across wave dampening chamber 19, the wave is barely noticeable. FIG. 8f shows that over time wave 32 has completely dissipated and that no residual waves or water movements remain within wave dampening chamber 19. This is the preferred condition.

It is important to note here that although the breaking wave is quickly dissipated within wave dampening chamber 19, because the inclined section 13 is oriented at an oblique angle within pool 1, the breaking wave 32 will continue to peel across the width of pool 1, thereby enabling surfers to continue to surf and ride the breaking waves. That is, although this cross section view shows the wave breaking for only a moment, i.e. at or near the breaker line 10, it can be seen that because the inclined section 13 is extended at an oblique angle, the waves that the breaker line causes to break will continue to break and peel laterally across the entire width of the pool.

FIG. 9a shows a similar wave 34 having the same initial wave height and size that begins to break and enter into wave dampening chamber 19, wherein how the wave 34 changes as a result of raised floor 20 having a porosity of zero is shown over time. FIGS. 9a, 9b, 9c, 9d, 9e and 9f essentially show raised floor 20 represented by a solid floor which is equivalent to a floor having a porosity of zero. FIG. 9b shows that by the time wave 34 has moved onto raised floor 20, the wave 34 has stopped breaking and a crest of white water has begun to form on top. At this point, the wave has reduced in height somewhat, and there isn't much difference between wave 32 and wave 34. FIG. 9c, however, shows that by the time wave 34 has moved to about two thirds of the way across raised floor 20, the wave has actually crested and is no lower in height than it was moments after it entered into chamber 19. Likewise, FIG. 9d shows that the height of the wave 34 stays substantially the same as it continues forward and is about to hit end wall 12. FIG. 9e shows that even after being reflected by end wall 12, wave 34 still hasn't changed much in height or shape. FIG. 9f shows wave 34 progressing over the top 17 of inclined section 13, wherein the crest begins to subside, and the wave rounds out to form more of a wake or swell, wherein the size of wave 34 remains relatively unchanged.

Figure 10B:
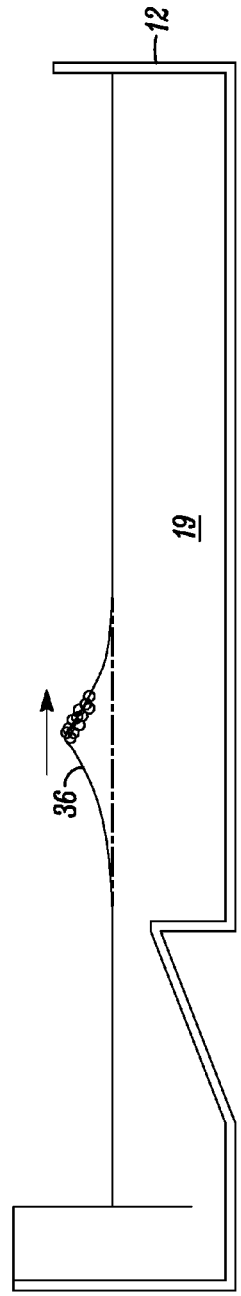
Figure 10C:
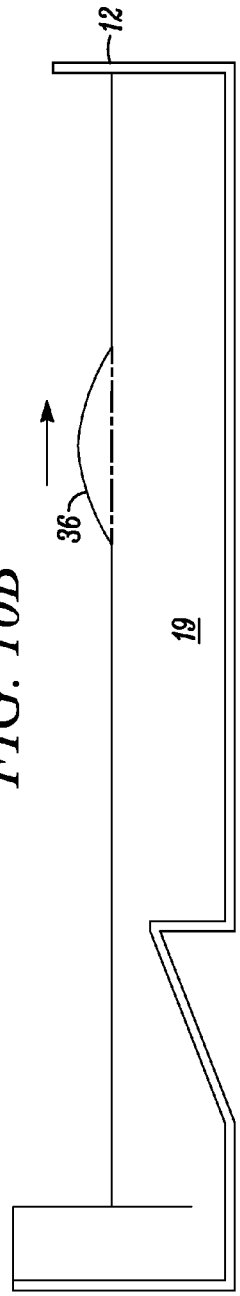
Figure 10D:
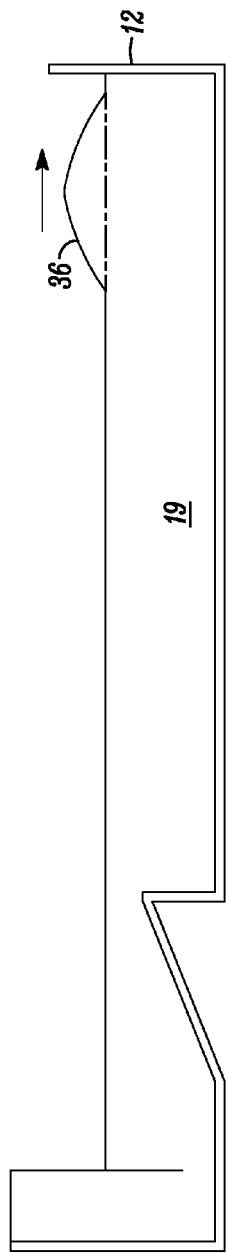
Figure 10E:
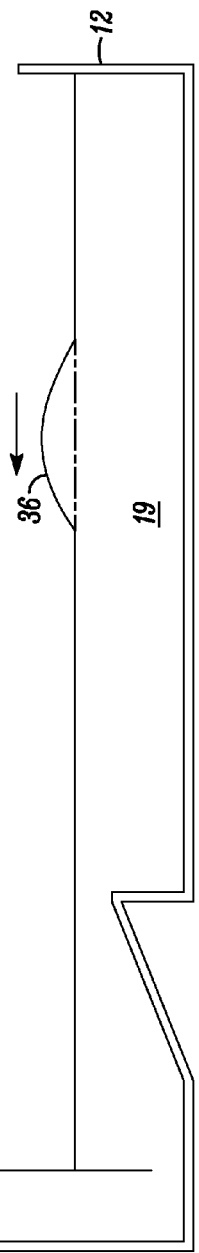
Figure 10F:
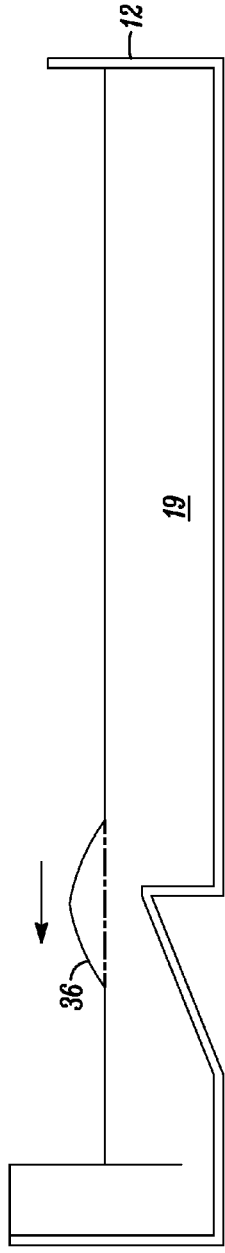

Likewise, FIG. 10a shows another wave 36 having the same initial shape and height that begins to break and enter into wave dampening chamber 19, wherein how the wave 36 changes as a result of raised floor 20 having a porosity of one can be seen over time. Because a porosity of one is essentially a transparent floor, FIGS. 10a, 10b, 10c, 10d, 10e and 10f do not even show a raised floor 20. FIG. 10b shows that by the time wave 36 has moved onto wave dampening chamber 19, it has stopped breaking and a crest of white water has begun to form on top. At this point, the wave is only slightly reduced in height and there isn't much difference between this wave and the other two waves discussed above. FIG. 10c, however, shows that while wave 36 has reduced in height slightly, it has flattened out to form a rounded wake or swell. That is, by the time wave 36 has moved about two thirds of the way across, wave 36 has changed into a rounded wake or swell which still contains a significant amount of wave mass and energy, i.e., little or no energy has been dissipated. FIG. 10d shows that wave 36 continues in this same shape and size at it strikes end wall 12, and FIG. 10e shows that wave 36 essentially doesn't change its shape and size even after it is reflected back by end wall 12. FIG. 10f shows wave 36 travelling with the same shape and size in a reverse direction over the top 17 of inclined section 13.

In addition to the above, the following assumptions and/or considerations relative to the depth of raised floor 20 apply:

First, for any given set of parameters, the maximum submerged depth $d_{floor}$ of raised floor 20 should be equal to or less than the break depth of inclined section 13, i.e., raised floor 20 can be slightly above the break point but it cannot be any deeper than the break point. This is because if raised floor 20 is deeper than the break depth the waves would not develop nor break properly onto wave dampening chamber 19. And because raised floor 20 is preferably extended substantially horizontally from inclined section 13 toward end wall 12, the top 17 of inclined section 13 should be at the same depth as raised floor 20, wherein they are both preferably located at the break depth.

Second, the submerged depth of raised floor 20 $d_{floor}$ should be equal to or less than the height of wave 5 produced within wave forming portion 9. This helps to allow the waves to break properly. Although the submerged depth of raised floor 20 can be less than the wave height, it should not be too much less, i.e., if raised floor 20 is too shallow, for instance, unwanted backwash can occur.

Third, the submerged depth of raised floor 20 $d_{floor}$ should be relatively shallow compared to the overall depth of solid chamber floor 21 beneath raised floor 20 (Chamber depth or $d_{chamber}$), wherein the preferred ratio of the submerged depth of raised floor 20 relative to the depth of wave dampening chamber 19 beneath raised floor 20 ($d_{floor}/d_{chamber}$) is in the range of about one half to one fourth, with the preferred ratio being about one third. Stated differently, the depth of wave dampening chamber 19 beneath raised floor 20 $d_{chamber}$ is preferably two to four times the depth of raised floor 20, with the preferred ratio being about two and a half to three in most cases. Accordingly, if raised floor 20 is four feet below the standing mean water level, solid chamber floor 21 should extend down about ten to twelve feet beneath raised floor 20, wherein the preferred total depth of solid chamber floor 21 beneath the standing mean water level 14 would then be about fourteen to sixteen feet.

Figure 14:
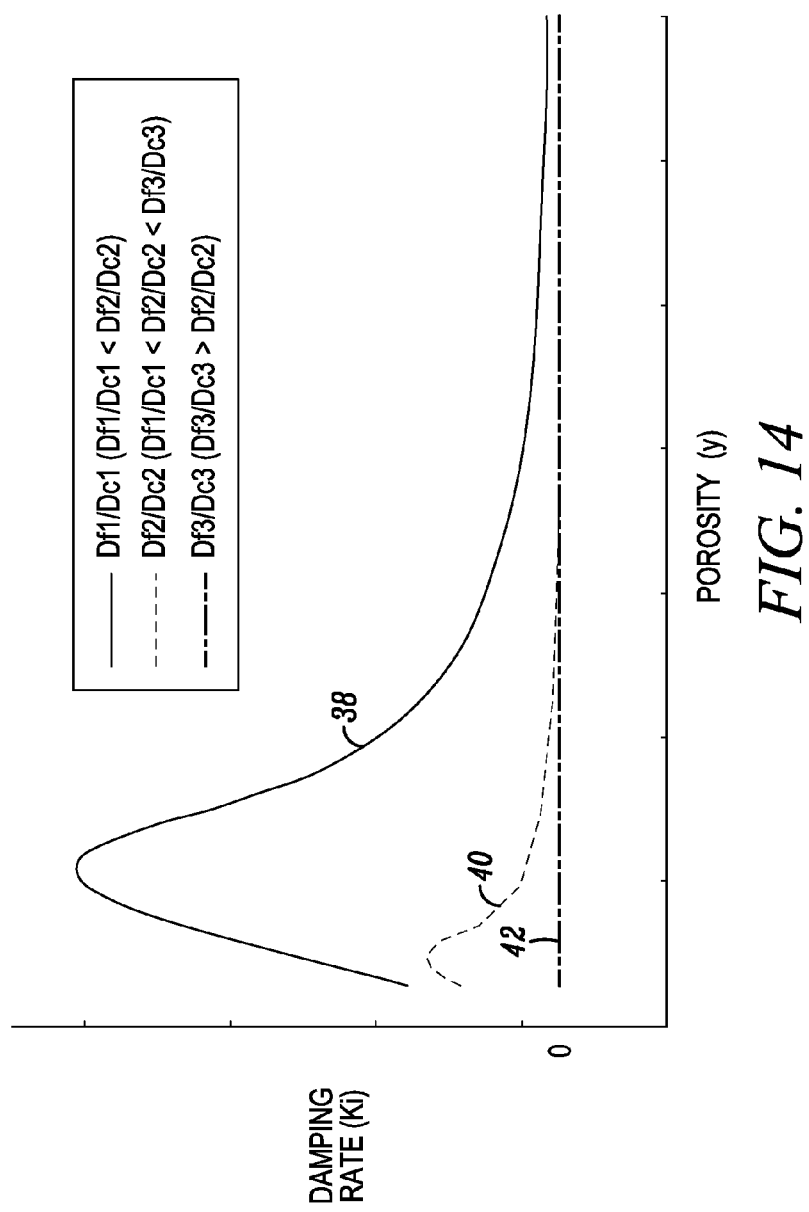
FIG. 14 is a chart showing the dampening rate relative to the porosity of a given raised floor, wherein the effects of the submerged depth of the raised floor on the dampening rate for three different submerged depth ratios (depth of raised floor divided by depth of chamber floor below raised floor) are shown.

In this respect, FIG. 14 shows the variations of the complex wave number $K_i$ (the dampening rate) plotted versus the porosity for three different submerged depths of raised floor 20. The three different raised floor 20 depths in this case are represented by the ratio (Df/Dc) which is the ratio of the raised floor 20 depth (relative to the standing mean water level) to the distance that solid chamber floor 21 extends beneath raised floor 20, i.e., the ratio is expressed as $d_{floor}/d_{chamber}$. It can be seen that in this case the three different ratios are represented by three different lines, wherein solid line 38 (designated as Df1/Dc1) represents a ratio smaller than that represented by dashed line 40 (designated as Df2/Dc2), and dashed line 40 (designated as Df2/Dc2) represents a ratio smaller than that represented by broken solid line 42 (designated as Df3/Dc3). For these reasons, it can be seen that the dampening rate is at a more preferred amount when the depth ratio is relatively small. That is, when the depth ratio is relatively small, such as shown by solid line 38, which means that the depth of raised floor 20 is relatively shallow compared to the overall depth of chamber 19, a relatively high dampening rate is achieved, as shown by the peak of line 38. In this case, the preferred peak value of dampening rate Ki occurs when raised floor 20 has a relatively low porosity, such as between around 0.05 to 0.10, again, depending on the actual conditions. But when the depth of raised floor 20 is increased (raised floor 20 becomes deeper relative to the depth of solid floor 21), such as shown by dashed line 40, and broken solid line 42, it can be seen that the dampening rate is reduced significantly, wherein it can be seen that regardless of the porosity of raised floor 20, when the ratio of raised floor 20 to chamber 19 depth ($d_{floor}/d_{chamber}$) is increased too much, virtually no dampening will occur. For purposes of this example, the other conditions $H/d_{pool}$, L, T and $\xi_b$ are assumed to be constant.

For example, when considering dashed line 40, it can be seen that the maximum dampening rate achievable in that case is only a fraction of the maximum dampening rate achievable when the depth ratio is relatively small as shown by line 38. Likewise, with respect to broken solid line 42, it can be seen that the maximum dampening rate achievable in that case, regardless of the porosity of raised floor 20, is zero. This indicates that if the depth of raised floor 20 is too great, or in other words, when raised floor 20 is too deep relative to the depth of solid chamber floor 21, then, the dampening characteristics of raised floor 20, regardless of its porosity, will be significantly reduced or even eliminated. According to one estimate, in order for raised floor 20 to effectively dampen the waves, the distance that chamber floor 21 extends below raised floor 20 must be equal to or greater than about twice the depth of raised floor 20 relative to standing mean water level 14, i.e., $d_{chamber} \geq 2(d_{floor})$.

The reason that the dampening rate is reduced so significantly when the depth ratio of raised floor 20 to chamber 19 depth ($d_{floor}/d_{chamber}$) is greater than a certain minimum is because there has to be a sufficient depth under raised floor 20 for the energy absorbing vortices to be formed and therefore for the wave energy to be distributed and dissipated. That is, the overall concept of wave dampening is that the wave energy must be distributed over the depth of the pool, which in this case, is the overall depth of wave dampening chamber 19, and when the waves travel over raised floor 20, the wave energy is allowed to pass through the perforations 16, such that the waves actually "feel" the bottom of chamber floor 21, and because the wave energy is allowed to pass both up and down through the perforations 16, the wave energy has to be distributed both above and below the raised floor 20, i.e., both $d_{floor}$ and $d_{chamber}$. In this respect, the porosity of raised floor 20 represents an obstacle and therefore restricts the passage of wave energy over the water column below it, wherein this results in the formation of energy absorbing vortices and eddies both above and below the raised floor 20. Accordingly, if the depth of solid chamber floor 21 is too small relative to the depth of raised floor 20, there won't be sufficient space below the raised floor 20 for the waves to distribute their energy, which results in less wave dampening.

Based on the above dampening rate formula, as well as the above mentioned parameters, and other factors and considerations discussed above, and using the methodology described below, the following preferred designs for sample wave pools have been determined:

Example One

When it is desirable to produce barrelling waves that range in height from three to eight feet high, with a period of about fifteen seconds, the preferred depth of horizontal floor 11 or Pool depth is typically about three times the wave height. Accordingly, if the desired wave height is three feet, the preferred pool depth would be nine feet deep, and likewise, if the desired wave height is eight feet, the preferred pool depth would be twenty four feet deep. These represent preferred minimum and maximum pool depth values $d_{pool}$ for each circumstance.

The preferred slope of inclined section 13 to create barrelling type waves, having a fifteen second period, is preferably between about 5% and 10%, which is the slope that extends up from horizontal floor 11. At the same time, inclined section 13 preferably terminates at the breaker depth, and raised floor 20 is preferably extended substantially horizontally from inclined section 13 toward end wall 12 at that same depth. In this example, based on the above factors, the preferred breaker depth has been determined to be about the same as the wave height divided by 1.6, with a preferred range for creating plunging type breaker waves being about the wave height divided by 1.0 to 1.6. Accordingly, when the wave height is three feet, and the preferred pool depth is nine feet, the preferred submerged depth of raised floor 20 would be about 1.875 feet (3 divided by 1.6). On the other hand, when the wave height is eight feet, and the preferred pool depth is twenty four feet, the preferred submerged depth of raised floor 20 would be about five feet (8 divided by 1.6). Based on the above, it can be seen that the preferred depth of raised floor 20 is between about 1.875 feet (when making barrelling waves that are three feet high) and five feet (when making barrelling waves that are eight feet high). The actual depth may vary and be calculated based on the desired initial wave height, etc.

It has also been determined that the preferred depth of wave dampening chamber 19 (extending beneath raised floor 20) is about three times the depth of raised floor 20, or in other words, what this means is that the total depth of chamber 19 is preferably about four times the depth of raised floor 20, i.e., the ratio between the distance above raised floor 20 and the distance below raised floor 20 (to the chamber floor 21) is about one-third. Accordingly, when the wave is three feet high, and the raised floor is 1.875 feet deep (below the standing mean water level), the total depth of chamber floor 21 is preferably about 7.5 feet (1.875 times 4). At the same time, the depth of chamber floor 21 beneath raised floor 20 is preferably about 5.625 feet (1.875 times 3). Likewise, when the wave is eight feet high, and raised floor 20 is five feet below the standing mean water level, the total depth of chamber floor 21 is preferably about twenty feet (5 times 4), whereas, the depth of chamber floor 21 below raised floor 20 is preferably about fifteen feet (5 times 3).

In the context of this example, the preferred porosity that would help achieve the maximum dampening rate for the raised floor 20 would be in the regime of 0.05 to 0.15, which means that only about 5% to 15% of the raised floor would be comprised of the openings to enable water to pass through. In other words, the maximum dampening rate would be achieved when only about 5% to 15% of raised floor 20 allows water to pass through, wherein that amount preferably forms energy absorbing vortices and eddies sufficient to permit the maximum amount of dampening of the waves to take place. Moreover, when the wave height is on the higher end of the spectrum within each regime, the porosity should also be relatively high, i.e., when the waves are eight feet high, the preferred porosity should be around 0.15, whereas, when the waves are three feet high, the preferred porosity should be around 0.05.

Example Two

When it is desirable to produce spilling waves that range in height from three to eight feet, with a period of about eight seconds, the preferred depth of horizontal floor 11 or Pool depth is typically about three times the wave height. Accordingly, if the desired wave height is three feet, the preferred pool depth would be nine feet. Likewise, if the desired wave height is eight feet, the preferred pool depth would be twenty four feet. These represent the preferred minimum and maximum pool depth values $d_{pool}$ for each circumstance. And, to create spilling type waves, the preferred slope of inclined section 13 is preferably at or below 5%, which is the slope that extends up from horizontal floor 11. At the same time, as discussed previously, inclined section 13 preferably terminates at the breaker depth, wherein the top 17 of inclined section 13 and raised floor 20 would also be located at the same depth.

In this example, based on the above factors, the preferred breaker depth has been determined to be equivalent to about the wave height divided by 0.8, with a preferred range for creating spilling waves being about the wave height divided by 0.6 to 1.0. Accordingly, when the wave height is three feet, and the preferred pool depth is nine feet, the preferred submerged depth of raised floor 20 would be about 3.75 feet (3 divided by 0.80). On the other hand, when the wave height is eight feet, the preferred pool depth would be twenty four feet, and the preferred depth of raised floor 20 would be about ten feet (8 divided by 0.80). Based on the above, it can be seen that the depth of raised floor 20 in this example should be between about 3.75 feet (when making spilling waves that are three feet high) to 10.0 feet (when making spilling waves that are eight feet high). The actual depth can be calculated based on the desired initial wave height, etc.

It has also been determined that the preferred depth of wave dampening chamber 19 beneath raised floor 20 is about two and a half times the depth of raised floor 20. Accordingly, when the wave height is three feet high, and raised floor 20 is 3.75 feet below the standing mean water level 14, the depth of chamber floor 21 beneath raised floor 20 is preferably about 9.375 feet (3.75 times 2.5), wherein the total depth of chamber 19 is about 13.125 feet (3.75 plus 9.375). On the other hand, when the wave is eight feet high, and raised floor 20 is ten feet below the standing mean water level 14, the depth of chamber floor 21 beneath raised floor 20 is preferably about twenty five feet (10.0 times 2.5), wherein the total depth of chamber 19 is about thirty five feet (25 plus 10).

In the context of this example, the preferred porosity that would help achieve the maximum dampening rate for raised floor 20 would be in the regime of 0.10 to 0.20, which means that only about 10% to 20% of raised floor 20 would be comprised of openings to enable water to pass through. In other words, the maximum dampening rate would be achieved when only about 10% to 20% of raised floor 20 allows water to pass through, wherein that amount preferably forms energy absorbing vortices and eddies that permit the appropriate dampening to take place. And, within this range, when the waves are higher, the porosity should also be higher. For example, when the waves are eight feet high, the preferred porosity is likely to be around 0.20, whereas, when the waves are three feet high, the preferred porosity is likely to be around 0.10.

Example Three

In another example, when it is desirable to produce barrelling waves that are five feet high, having a period of fifteen seconds, in a wave pool having a horizontal floor 11 that is fifteen feet deep, the following applies:

The slope of inclined section 13 is preferably about 10% to enable barrelling type waves to be produced. And, in this example, based on the above factors, the preferred breaker depth is determined to be about three feet. Accordingly, in this example, with the wave height being five feet, and the preferred pool depth being about fifteen feet, the preferred submerged depth of raised floor 20 would be about three feet. Note that if this value is much greater than three feet, the waves won't break properly, and if this value is much less than three feet, there is the risk of backwash occurring.

It has also been determined that the preferred depth of wave dampening chamber 19 beneath raised floor 20 is about three times the depth of raised floor 20, or about nine feet (3 times 3), which makes the total depth of chamber 19 beneath standing mean water level 14 about twelve feet (9 plus 3). Stated differently, the total depth of chamber 19 below the standing mean water level 14 is preferably about twelve feet, whereas, the depth of chamber floor 21 beneath raised floor 20 is about nine feet. The importance of this ratio can be seen from the fact that if the depth of chamber floor 21 beneath raised floor 20 is reduced to six feet, this would represent a ratio of only two, between the chamber depth and raised floor depth ($d_{floor}/d_{chamber}$), i.e., three feet, compared to six feet, wherein the dampening rate would effectively be halved. On the other hand, if the depth of raised floor 20 is made smaller, the dampening rate would not be affected as much, except that eventually, if raised floor 20 became too shallow, backwash would occur.

In the context of this example, the preferred porosity that would help achieve the maximum dampening rate for raised floor 20 would be in the regime of 0.05 to 0.15, which means about 5% to 15% of the raised floor would be comprised of openings that would allow water to pass through, wherein that amount preferably forms energy absorbing vortices and eddies above and below raised floor 20 sufficient to permit dampening to occur.

The analysis or methodology that may be used to design a wave pool 1 for any given application is preferably as follows:
1) Choose the height of the wave that is desired to be created in the wave pool, which is typically between three feet to eight feet high, depending on the level of surfing expertise the wave pool is designed to accommodate. Other properties of the wave, including wave length and wave period, should also be selected.
2) Determine the pool floor depth which is the depth of horizontal floor 11. In the preferred embodiment, this is about three times the desired wave height.
3) Determine the type of wave to be produced. If it is a barrelling wave, one can set the slope of inclined section 13 to be about 5% to 10%, and if it is a spilling wave, one can set the slope of inclined section 13 to be less than 5%. The decision to select the type of wave should, in addition to considering what type of wave is most suitable for surfing, include a consideration of the construction costs, i.e., one should choose a steeper slope to reduce the size and therefore the cost of construction.

4) Determine the break depth of inclined section 13. This is generally determined using known formulas that take into account the wave height, wave period, pool depth, slope of inclined section 13, and breaker shape (Iribarren). Based on these calculations, it has been determined that generally speaking the following guidelines can be used: To produce barrelling type waves, the preferred breaker depth can be determined by dividing the preferred wave height by 1.0 to 1.6, and to produce spilling type waves, the preferred breaker depth can be determined by dividing the preferred wave height by 0.6 to 1.0. The top of the inclined section 13 must be no deeper than the break depth to ensure that the waves break properly.

5) Set the depth of raised floor 20 (as well as the top 17 of inclined section 13) equal to (or very near) the break depth, and extend raised floor 20 across wave dampening chamber 19 in a substantially horizontal manner at or near the break depth. In this respect, it should be noted that raised floor 20 can be slightly shallower than the break depth, or inclined slightly, as explained later in connection with an alternate embodiment, but it should not be any deeper than the break depth, as the waves will not break properly if the inclined section 13 is lower than the break depth.

6) Set the depth of solid chamber floor 21 based on the parameters discussed above as follows: When producing barrelling type waves, the preferred depth ratio between raised floor 20 and chamber 19, as designated by ($d_{floor}/d_{chamber}$), is preferably 0.33 (1/3). Stated differently, the depth of chamber floor 21 beneath raised floor 20 should be three times the depth of raised floor 20. Another way to look at this is that the total depth of chamber 19 relative to the standing mean water level should be four times the depth of raised floor 20. When producing spilling type waves, the preferred depth ratio between raised floor 20 and chamber 19, as designated by ($d_{floor}/d_{chamber}$), is preferably about 0.40 (1/2.5). Stated differently, the depth of chamber floor 21 beneath raised floor 20 should be two and a half times the depth of raised floor 20. Another way to look at this is that the total depth of chamber 19 relative to the standing mean water level should be three and a half times the depth of raised floor 20.

7) Finally, the preferred porosity that would help achieve the maximum dampening rate for raised floor 20 for a particular wave height should be determined. The overall regime that should be used is preferably within the range of between 0.0 and 0.50, with a more preferred range being about 0.05 to 0.25. And more specifically, when producing barrelling type waves, the porosity regime of 0.05 to 0.15 should be used, and when producing spilling type waves, the porosity regime of 0.10 to 0.20 should be used. And, within these ranges, a general rule of thumb to follow is that when the waves are higher, the porosity should be higher as well.

Figure 11:
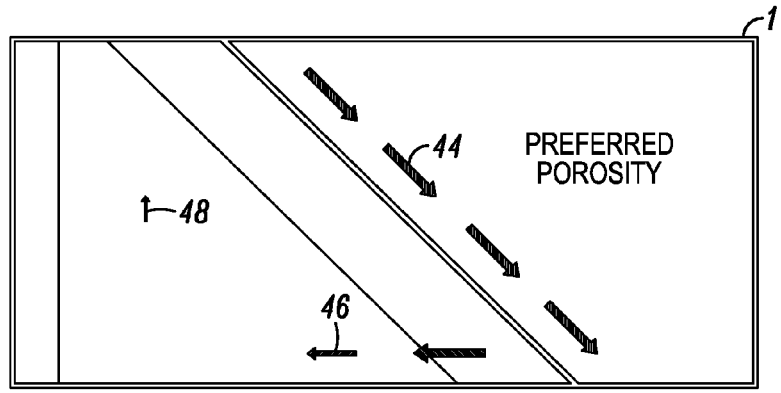
FIG. 11 is a plan view of the wave pool of the present invention showing the current patterns that can occur along the obliquely oriented inclined section resulting from the wave dampening chamber having a raised floor with a preferred porosity, wherein the diagonal arrows 44 represent the current patterns in the along shore direction, the arrows from right to left 46 represent rip currents travelling in the reverse direction, and the small upward arrow 48 represents a restoration current that helps to keep the pool in equilibrium, wherein the boldness of the arrows represents the strengths of those currents relative to those shown in FIGS. 12 and 13.
Figure 12:
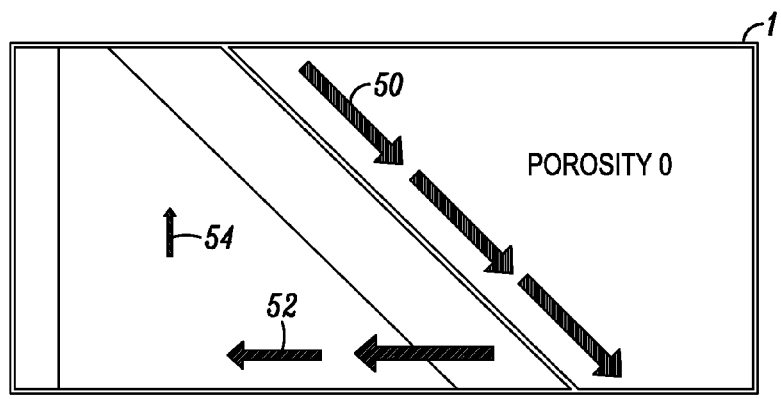
FIG. 12 is a plan view of the wave pool of the present invention showing the current patterns that can occur along the obliquely oriented inclined section resulting from the wave dampening chamber having a raised floor with a porosity of zero, wherein the diagonal arrows 50 represent the current patterns in the along shore direction, the arrows from right to left 52 represent rip currents travelling in the reverse direction, and the small upward arrow 54 represents a restoration current that keeps the pool in equilibrium, wherein the boldness of the arrows represents the strengths of those currents relative to those shown in FIGS. 11 and 13.
Figure 13:
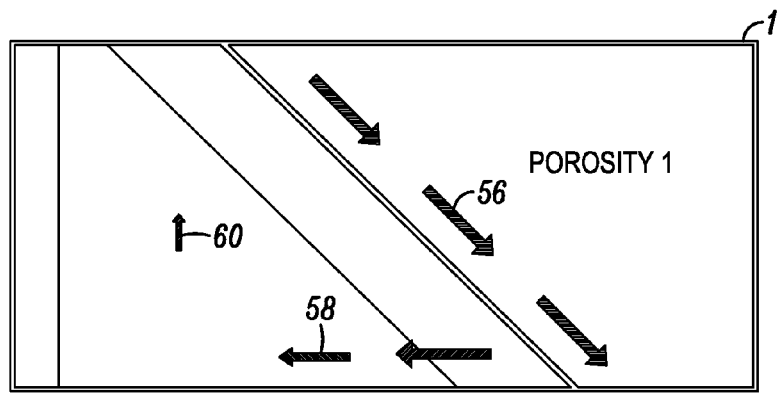
FIG. 13 is a plan view of the wave pool of the present invention showing the current patterns that can occur along the obliquely oriented inclined section resulting from the wave dampening chamber having a raised floor with a porosity of one, wherein the diagonal arrows 56 represent the current patterns in the along shore direction, the arrows from right to left 58 represent rip currents travelling in the reverse direction, and the small upward arrow 60 represents a restoration current that keeps the pool in equilibrium, wherein the boldness of the arrows represents the strengths of those currents relative to those shown in FIGS. 11 and 12.

In addition to reducing the height and size of the waves, wave dampening chamber 19 preferably acts upon the water within wave pool 1 to reduce rip currents and wave reflections in the manner shown in FIGS. 11 to 13. The direction of each arrow in FIGS. 11-13 represents how the currents move, and the boldness of each arrow represents the relative strength of those currents—the bolder the lines the stronger the current. Accordingly, as with the other examples discussed above, FIG. 11 shows how the currents move and the strength of those currents when raised floor 20 has a preferred porosity, whereas, FIG. 12 shows how the currents move and the strength of those currents when raised floor 20 has a porosity of zero, and FIG. 13 shows how the currents move and the strength of those currents when raised floor 20 has a porosity of one. Generally speaking, these drawings are plan views of wave pool 1 with various current patterns, including the following: 1) the along shore current that generally follows obliquely in the along shore direction of inclined section 13 represented by arrows 44, 50 and 56, 2) rip currents travelling in a reverse direction down inclined section 13 represented by arrows 46, 52 and 58, and 3) the restoring flow of water back to the opposite side of wave pool 1 represented by arrows 48, 54 and 60.

More specifically, FIG. 11 shows the current patterns and strengths when raised floor 20 has a preferred porosity, wherein arrows 44, 46 and 48 represent the actual currents, and the thinness of the lines indicate that the currents are not as strong as they are in FIGS. 12 and 13. It can also be seen that arrows 44 are slightly bolder than arrows 46, indicating that the along shore currents are stronger than the rip currents, and that arrows 46 are slightly bolder than arrow 48, indicating that the rip currents are stronger than the restoration currents.

FIG. 12 shows the current patterns and strengths when raised floor 20 has a zero porosity, wherein arrows 50, 52 and 54 are bolder than the comparable arrows shown in FIGS. 11 and 13. This denotes that the currents that are produced in this case are the strongest overall. For example, arrows 50 which represent the along shore currents are significantly bolder than arrows 44 in FIG. 11 and arrows 56 in FIG. 13, indicating that the along shore currents are significantly stronger when the porosity is zero than in the other cases. Likewise, the rip currents are shown to be significantly stronger in this case than in FIGS. 11 and 13, i.e., the arrows 52 in FIG. 12 are bolder than arrows 46 in FIG. 11 and arrows 58 in FIG. 13. Moreover, the restoration currents in this case are shown to be significantly stronger than they are in FIGS. 11 and 13, i.e., arrow 54 is bolder than arrow 48 in FIG. 11 and arrow 60 in FIG. 13. It can also be seen that within FIG. 12, arrows 50 are bolder than arrows 52, indicating that the along shore currents are stronger than the rip currents, and that arrows 52 are bolder than arrow 54, indicating that the rip currents are stronger than the restoration currents.

FIG. 13 shows the current patterns and strengths when raised floor 20 has a porosity of one, wherein the boldness of arrows 56, 58 and 60 in this figure is in between the boldness of the arrows found in FIGS. 11 and 12. This denotes that the strength of the currents that are produced in this case is in between those shown in FIGS. 11 and 12. For example, arrows 56 representing the along shore currents in this figure are bolder than comparable arrows 44 shown in FIG. 11, but not as bold as comparable arrows 50 shown in FIG. 12, indicating that the along shore currents in this case are stronger than those shown in FIG. 11, but not as strong as those shown in FIG. 12. Likewise, arrows 58 representing the rip currents are bolder than comparable arrows 46 shown in FIG. 11, but not as bold as comparable arrows 52 shown in FIG. 12, indicating that the rip currents in this case are stronger than those shown in FIG. 11, but not as strong as those shown in FIG. 12. And, arrow 60 representing the restoration current is bolder than comparable arrow 48 shown in FIG. 11, but not as bold as comparable arrow 54 shown in FIG. 12, indicating that the restoration currents in this case are stronger than those shown in FIG. 11, but not as strong as those shown in FIG. 12. Moreover, it can be seen that within FIG. 13, arrows 56 are bolder than arrows 58, and that arrows 58 are bolder than arrow 60, indicating the appropriate differences in current strengths.

It can be seen from these drawings that as the periodic waves break, an along shore current is created that travels in an oblique direction along the breaker line, wherein due to repeated wave action, i.e., as the waves continue to peel obliquely and progressively across the inclined section 13, a current pattern will begin to form that causes water to flow laterally across in the along shore direction toward second side wall 8. In fact, in a typical situation where the waves are not dampened but are reflected off end wall 12, as more water tends to build up along second wall 8, more water will then have to flow back down inclined section 13, thereby forming greater rip currents. More water will also need to be restored toward first wall 6 to keep the water level within the pool in equilibrium.

But when the waves are dampened by wave dampening chamber 19 with a raised floor 20 having a preferred porosity, there is less water that would flow in the along shore direction, and therefore, less water buildup along second wall 8, and therefore, less rip currents flowing back against the oncoming waves. Likewise, when the waves are dampened and diminished by the time they are reflected back and reach inclined section 13, there is no residual wave motion that is reflected back against the oncoming waves, thereby further reducing the chances of the waves being adversely affected. The overall result is that there are fewer rip currents and wave reflections that are produced that can interfere with and adversely affect the breaking of the next oncoming waves. And, in order to keep wave pool 1 in substantial equilibrium, and to produce ideal surfing waves having a frequency of at least four waves per minute, i.e., one wave every fifteen seconds, the wave reflections should be no more than 5% and the rip currents should be at most Froude=0.1.

The present invention enables the frequencies of waves in wave pools to be increased, i.e., more periodic waves can be generated in a shorter amount of time, since there are no strong rip currents and wave reflections that can adversely affect each oncoming wave. Also, in a commercial wave pool environment, a greater wave frequency advantageously results in increased rider throughput, which means greater revenue and a higher rate of return on fixed assets. Reducing rip currents and wave reflections also allows the waves to be made larger and more powerful without having to increase pool size, nor increase the risk of injury to participants, etc. It also makes more efficient use of existing resources, such as land, since wave pools do not have to be made larger to increase wave size, quality and frequency. Also, as mentioned above, an additional benefit of the present invention is that spectator viewing areas behind the pool can be located closer to the waves, which can enhance the viewers' experience.

Figure 15:
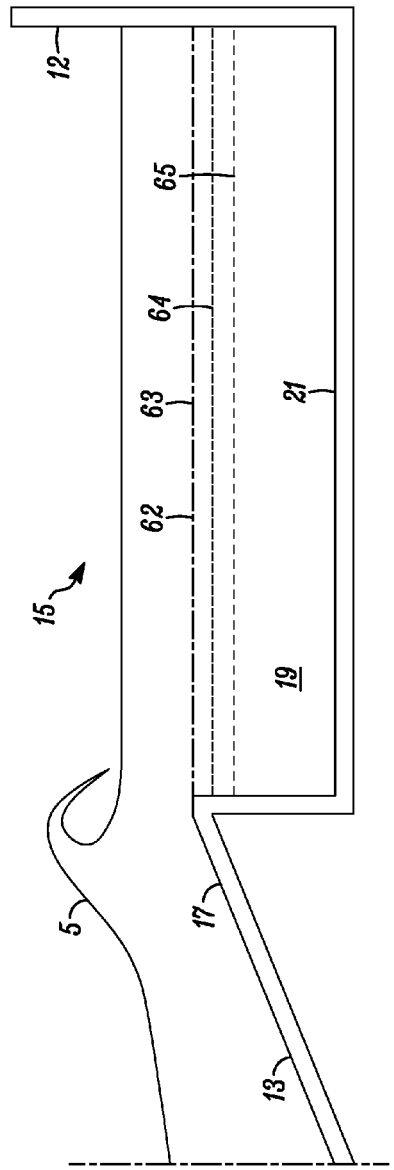
FIG. 15 is a cross-section showing an alternate embodiment of the present invention showing the wave dampening chamber with a raised floor having multiple layers wherein each layer has a different porosity.

An alternate embodiment is shown in FIG. 15 wherein raised floor 20 has been replaced by a multi-layer raised floor 62. In this case, what is shown is floor 62 having three different perforated sheets or layers 63, 64, 65, each separated by a gap of a predetermined distance, wherein each layer has a different porosity. In this example, top layer 63 preferably has a porosity that is greater than middle layer 64, and middle layer 64 preferably has a porosity that is greater than bottom layer 65. Other variations with different layers and porosity arrangements are also possible and contemplated. Although three layers are shown, it can be seen that two, or four, or virtually any number of layers can be provided.

By configuring raised floor 62 in this manner, certain energy absorbing vortices and eddies are produced by top layer 63, which are different from the energy absorbing vortices and eddies produced by layers 64 and 65, wherein the combination of these energy absorbing vortices and eddies can make floor 62 more effective in providing the overall dampening characteristics of wave dampening chamber 19.

Figure 16:
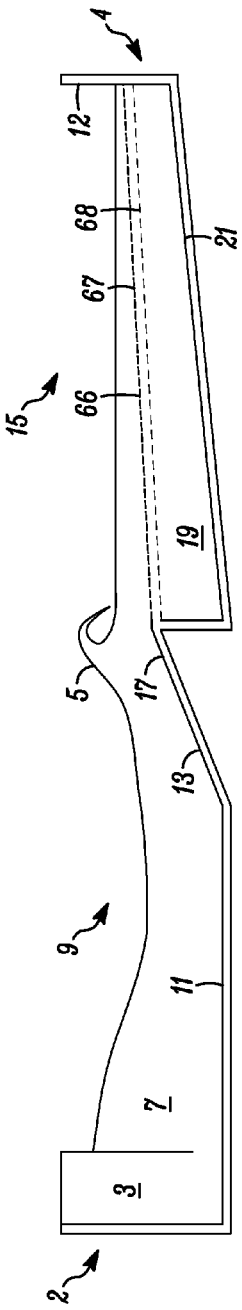
FIG. 16 is a cross-section showing an alternate embodiment of the present invention showing the wave dampening chamber having an inclined raised floor and an inclined chamber floor.

In another alternate embodiment, shown in FIG. 16, raised floor 20 has been replaced by an inclined raised floor 66. Raised floor 66 is also shown having two layers 67, 68, wherein top layer 67 has a porosity greater than lower layer 68. Inclined raised floor 66 is preferably extended from the top 17 of inclined section 13 which is preferably at the break depth, as discussed, and is then sloped upward gradually. The slope at which raised floor 66 extends upward can be in the range of from horizontal to about 1:20, although raised floor 66 should not reach the standing mean water level, as this can create unwanted backwash. By applying a slope to raised floor 66, the dampening rate thereof can be altered as the submerged depth of raised floor 20 changes relative to the direction that the wave travels. As explained before, as long as raised floor 66 does not extend any deeper than the break depth, the waves will break properly, although if it becomes too shallow, unwanted backwash can occur.

In this embodiment, chamber floor 21 is also shown as being sloped upward which reduces the depth of chamber 19 and in turn reduces the cost of construction thereof. Altering the depth of chamber floor 21 in combination with altering the depth of raised floor 66 preferably helps to change the dampening rate of raised floor 66 along the length thereof, thereby allowing for the dampening rate to be altered such that it can remain a preferred amount relative to the height of the wave as it progresses forward. That is, as the waves are dampened and dissipated over time, they will become reduced in height, and therefore, the wave dampening characteristics of the wave dampening chamber 19 will not need to be as severe across the length of the chamber 19, i.e., the wave dampening characteristics of the raised floor 20 can be modified (reduced) in proportion to the extent to which the wave height is reduced as the waves progress.

Figure 17:
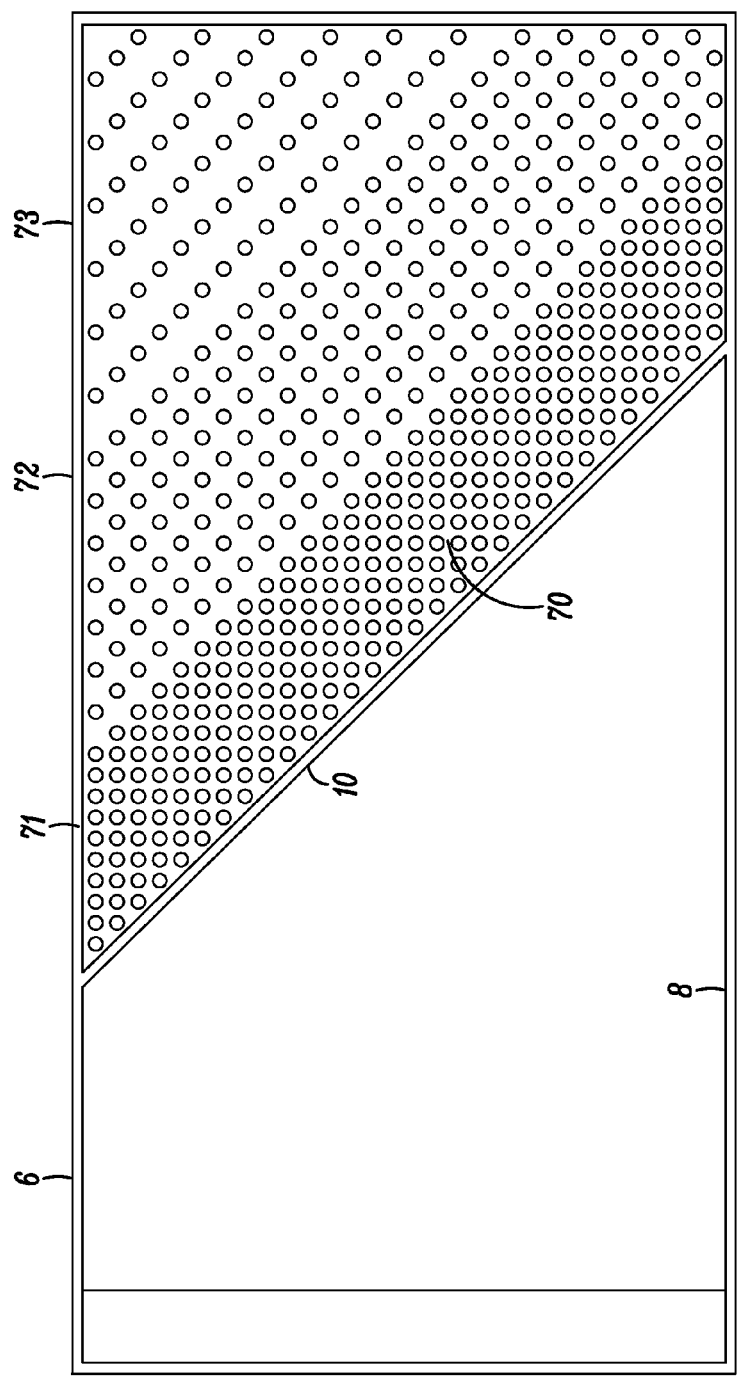
FIG. 17 is a plan view showing an alternate embodiment of the present invention showing the wave dampening chamber with a raised floor wherein the porosity of the raised floor varies from the breaker line toward the end wall of the pool.

Another embodiment is shown in FIG. 17, wherein raised floor 20 has been replaced by a varied porosity raised floor 70. In this case, an upstream first portion 71 of floor 70 preferably has a relatively high porosity, followed downstream by a second portion 72 having an intermediate porosity, followed again by a third portion 73 having a relatively low porosity. Because inclined section 13 and breaker line 10 are extended obliquely relative to wave pool 1, each portion 71, 72 and 73 is preferably extended obliquely relative to side walls 6, 8. The actual porosity at any given location can vary but is preferably within the same regime discussed previously, except that upstream portion 71 preferably has a relatively high porosity within that regime, and downstream portion 73 preferably has a relatively low porosity within that regime.

For example, if the porosity regime for a particular application is between 0.05 and 0.15, upstream portion 71 may have a porosity of 0.15, while middle portion 72 may have a porosity of 0.10, and downstream portion 73 may have a porosity of 0.05. Each portion can have a substantially constant porosity, or, the porosity can also be varied gradually from one end to the other. Although three portions are shown, it can be seen that two, or four, or virtually any number of varying porosity portions can be provided.

By creating variations in the porosity of raised floor 70 extending downstream, the preferred porosity ranges can be matched up with the preferred wave heights across floor 70. For example, as indicated above, within any given porosity regime, it is desirable for the porosity to be higher when wave 5 is higher. As such, by varying the porosity of raised floor 70, the porosity at any given point along floor 70 can be matched up with the wave height expected to exist at that point. That is, as the wave travels over wave dampening chamber 19, it will be reduced in height, and therefore, it may be appropriate for the porosity of the raised floor 20 to be lowered progressively to better accommodate the lower wave height conditions that exist downstream. For example, if wave 5 begins at four feet high, and then, through dampening, is reduced to three feet high, the preferred porosity under that circumstance may be 0.15 for the area where the wave is four feet high, but as the wave progresses downstream and drops to three feet high, the preferred porosity of floor 70 at the downstream point may be lower, such as 0.10, to match the lower wave height. This can be determined so that the preferred porosity matches up with the preferred wave height at any given point along raised floor 70, thereby helping to dampen the waves more efficiently.

FIG. 18 shows how raised floor 20 with perforations 16 can influence the movement of water above and below raised floor 20 to cause the waves 5 to be dampened. The large arrow 90 at the top denotes the direction that waves 5 travel. As can be seen, depending on where crest 75 or valley 77 of wave 5 is located relative to raised floor 20, and in particular, a particular perforation 16, the water will either flow up or down through perforations 16, or sideways, as shown by arrows 79, 80, 81 and 82. For example, when valley 77 of wave 5 is directly over a particular perforation 16, water will tend to flow up through perforations 16, as shown by arrow 79, which is the means by which equilibrium within body of water 7 is able to be restored. Likewise, when crest 75 of wave 5 is directly over a particular perforation 16, it can be seen that water will tend to flow down through perforations 16, as shown by arrows 80, which again, helps body of water 7 remain in substantial equilibrium.

Moreover, it can be seen that between any particular crest 75 and any particular valley 77, on any particular wave 5, water will tend to move sideways, not necessarily up and down, in relation to perforations 16. For example, beneath the downward slope 76 of crest 75 water will tend to flow sideways (forward) as shown by arrow 89 toward valley 77 of wave 5, whereas, beneath the upward side 78 of crest 75 water will tend to flow sideways (backward) as shown by arrow 90 toward valley 77 of wave 5.

What these up and down and sideways motions create are energy absorbing vortices and eddies that rotate above and below perforations 16 in raised floor 20 as shown in FIG. 18. In each case, the vortices are formed by and react to the up and down and sideways movements of water immediately above and below raised floor 20, wherein the water then circulates in the manner shown in FIG. 18. For example, when water is flowing up, see arrow 79, through perforations 16, as it is beneath valley 77 of wave 5, it can be seen that the vortices 81 that are formed to the front of each perforation 16 are rotating clockwise, whereas, the vortices 82 that are formed to the rear of each perforation 16 are rotating counter clockwise. Concomitantly, when water is flowing down, see arrows 80, through perforations 16, as it is beneath crests 75 of waves 5, it can be seen that the vortices 83 that are formed to the front of each perforation 16 are rotating counter clockwise, whereas, the vortices 84 that are formed to the rear of each perforation 16 are rotating clockwise.

Likewise, when water is moving sideways relative to each perforation 16, such as directly beneath upward side 78 of wave 5, it can be seen that the vortices 85 that are formed above raised floor 20 are rotating clockwise, whereas, the vortices 86 that are formed below raised floor 20 are rotating counter clockwise. At the same time, when water is moving forward relative to each perforation 16, as it is beneath downward slope 76 of wave 5, it can be seen that the vortices 87 that are formed above raised floor 20 are rotating counter clockwise, whereas, the vortices 88 that are formed below raised floor 20 are rotating clockwise.

By virtue of these varied movements of vortices and eddies that occur above and below raised floor 20, the energy of the waves traveling over raised floor 20 can be absorbed and dampened. That is, as each perforation 16 allows water to pass through, both up and down, and different water movements are created above and below each perforation 16, the water will circulate in the appropriate manner, such that energy absorbing vortices and eddies are created to help absorb wave energy and dampen the waves. Moreover, the extent to which these movements can dampen the waves will depend on the various factors discussed above, including the wave height, the porosity of raised floor 20, the depth of raised floor 20 relative to chamber floor 21, etc., which need to be taken into account when designing raised floor 20 for any particular application or condition. For example, when the wave height is relatively high and therefore the difference between crests 75 and valleys 77 are great, it can be seen that more water will need to be able flow up and down and sideways relative to perforations 16 for the appropriate vortices and eddies to be created, in which case, to accommodate the greater movements created thereby, the porosity of raised floor 20 will need to be increased. This explains why it is desirable for the porosity of raised floor 20 to be higher when the wave height is higher. Likewise, it can be seen that by having a deeper chamber floor 21 relative to the depth of raised floor 20, with greater room for water movement to occur, the movement of water flowing up and down and sideways relative to perforations 16 would be less inhibited, wherein the vortices and eddies formed above and below the raised floor 20 would also be less inhibited, since more wave energy can be distributed over the water columns beneath raised floor 20. This enables the vortices and eddies to develop and rotate properly, in which case, the energy absorbing properties thereof can be enhanced as well.

It should be noted that FIG. 18 is not to scale in that the depth of chamber floor 21 below raised floor 20 is preferably about two and a half to three times the depth of raised floor 20 relative to standing mean water level 14.

The preferred and alternate embodiments are shown and discussed herein. Nevertheless, variations which are not specifically described herein are within the contemplation of the present invention. It can be seen that while the preferred and alternate embodiments, configurations, dimensions and measurements have been disclosed, they should only be viewed as exemplary and not as limitations on the invention. Generally speaking, the goal is to provide a wave pool that produces waves desired by expert surfers which can be dampened in the manner discussed herein, wherein any embodiment or configuration sufficient to cause the waves within body of water 7 to break and then dampen in the manner discussed is contemplated.

What is claimed is:

1. A wave pool having a body of water therein with a standing mean water level comprising:

a wave generator located substantially at a first end of said wave pool for propagating periodic waves that travel across said body of water from said first end toward a second end, opposite said first end;

a first pool portion comprising a floor extended from said first end in the direction of said second end, said floor comprising an inclined section extended upward to at least the breaker depth of said inclined section;

a second pool portion extended from said floor toward said second end comprising a wave dampening chamber located substantially between said floor and said second end; and wherein said wave dampening chamber comprises a solid bottom floor and a perforated raised floor above said solid bottom floor, wherein said raised floor has a predetermined porosity (γ) within the range of 0<γ≤0.5 that helps to dampen the periodic waves traveling across said wave dampening chamber.

2. The wave pool of claim 1, wherein said floor of said first pool portion comprises a horizontal section followed downstream by said inclined section, wherein said inclined section is oriented obliquely relative to the travel direction of the periodic waves.

3. The wave pool of claim 1, wherein said inclined section has an upper surface that peaks at a maximum height that is substantially equivalent to the breaker depth thereof, and wherein said raised floor is extended substantially horizontally from said upper surface of said inclined section to said second end and is positioned no deeper than the breaker depth of said inclined section.

4. The wave pool of claim 1, wherein said raised floor has a porosity within the range of 0.05≤γ≤0.25.

5. The wave pool of claim 1, wherein said wave dampening chamber has a dampening rate that is a function of the following: the porosity of said raised floor, the ratio of the depth of said raised floor to the distance between said raised floor and said bottom floor, the incident wave height relative to the maximum depth of said first pool portion, the wave length, the wave period, and the breaker shape.

6. The wave pool of claim 1, wherein the distance that said bottom floor extends below said raised floor is about two to four times the distance that said raised floor extends below the standing mean water level of said body of water.

7. The wave pool of claim 2, wherein the porosity of said raised floor is within the range of about 0.05 to 0.25 and the distance that said bottom floor extends below said raised floor is about two and a half to three times the distance that said raised floor extends below the standing mean water level of said body of water.

8. The wave pool of claim 7, wherein the depth of said horizontal section of said first pool portion is within the range of about 9 feet to 24 feet, and wherein the slope of said inclined section is within the range of about 5% to 10% such that barreling waves having a height of about 3 feet to 8 feet are produced within said wave pool, and wherein the depth of said raised floor is about 1.8 feet to 5 feet beneath the standing mean water level of said body of water, and said bottom floor extends about 3.6 feet to 20 feet below said raised floor.

9. The wave pool of claim 2, wherein the porosity of said raised floor is within the range of about 0.10 to 030 and the depth of said horizontal section of said first pool portion is within the range of about 9 feet to 24 feet, and wherein the slope of said inclined section is less than about 5% such that spilling waves having a height of about 3 feet to 8 feet are produced within said wave pool, and wherein the depth of said raised floor is about 3.7 feet to 10 feet beneath the standing mean water level of said body of water, and said bottom floor extends about 7 feet to 30 feet below said raised floor.

10. The wave pool of claim 1, wherein said raised floor absorbs the energy of the periodic waves in said wave pool by the generation of a boundary layer of energy absorbing vortices and eddies that extend above and below said raised floor.

11. The wave pool of claim 1, wherein in operation, the height of the periodic waves propagated by said wave generator is greater than or equal to the depth of said raised floor beneath the standing mean water level of said body of water.

12. A method of dampening waves in a wave pool having a body of water therein with a standing mean water level comprising:
providing a wave generator substantially located at a first end of said wave pool;
propagating periodic waves that travel across said body of water from said first end toward a second end, opposite said first end;
causing the periodic waves to travel through a first pool portion comprising a floor having an inclined section extended upward substantially from said first end toward said second end, and causing the periodic waves to begin breaking at or near a breaker depth of said inclined section;
causing the periodic waves to travel through a second pool portion comprising a wave dampening chamber located substantially between said first pool portion and said second end, wherein said wave dampening chamber comprises a bottom floor and a perforated raised floor above said bottom floor, wherein said raised floor has a predetermined porosity; and
causing the periodic waves to be acted upon by said raised floor wherein the periodic waves are dampened by the generation of a boundary layer of energy absorbing vortices and eddies extending above and below said raised floor.

13. The method of claim 12, wherein said inclined section is oriented obliquely relative to the travel direction of the periodic waves, and the method comprises causing the periodic waves that are propagated to break obliquely relative to the travel direction of the periodic waves.

14. The method of claim 12, wherein an upper surface of said inclined section is located at or near the breaker depth of said inclined section, and wherein said raised floor is extended substantially horizontally from the upper surface of said inclined section toward said second end.

15. The method of claim 12, wherein said raised floor has a porosity γ within the range of 0.05≤γ≤0.25.

16. The method of claim 12, wherein said raised floor has a dampening rate that is based on the following:
the porosity of said raised floor, the ratio of the depth of said raised floor to the distance between said raised floor and said bottom floor, the incident wave height relative to the maximum depth of said first pool portion, the wave length, the wave period, and the breaker shape.

17. The method of claim 12, wherein the method comprises causing the periodic waves to travel toward said second end and to be reflected by an end wall located at or near said second end, wherein said wave dampening chamber helps to reduce the reflections and rip currents that may otherwise occur within said wave pool.

18. The method of claim 12, wherein in operation, the height of the periodic waves propagated by said wave generator is greater than or equal to the depth of said raised floor beneath the standing mean water level of said body of water.

19. The wave pool of claim 1, wherein said raised floor comprises first and second layers, and wherein said first layer is extended above said second layer and has a porosity that is greater than that of said second layer.

20. The wave pool of claim 1, wherein the porosity of said raised floor varies from one area of the floor to another.

21. The wave pool of claim 20, wherein the porosity of said raised floor gradually decreases in a direction from said first end to said second end.

22. The wave pool of claim 1, wherein said raised floor is inclined upward in the direction from said first end to said second end, and said bottom floor is inclined upward.

23. The method of claim 12, wherein said raised floor comprises first and second layers, wherein said first layer has a porosity that is greater than that of said second layer, and a predetermined space is provided between said first and second layers.

24. The method of claim 12, wherein the porosity of said raised floor varies from one area of the floor to another and the method comprises progressively changing the height and amplitude of the periodic waves as they travel across said raised floor.

\* \* \* \* \*